US012795552B2

(12) United States Patent
Khoshnevisan et al.

(10) Patent No.: US 12,795,552 B2
(45) Date of Patent: Nov. 10, 2026

(54) INDICATION OF CLPC RESET

(71) Applicant: QUALCOMM Incorporated, San Diego, CA (US)

(72) Inventors: Mostafa Khoshnevisan, San Diego, CA (US); Tao Luo, San Diego, CA (US); Xiaoxia Zhang, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 727 days.

(21) Appl. No.: 18/051,484

(22) Filed: Oct. 31, 2022

(65) Prior Publication Data

US 2024/0147379 A1 May 2, 2024

(51) Int. Cl.
*H04W 52/08* (2009.01)
*H04L 5/00* (2006.01)
*H04W 52/54* (2009.01)
*H04W 72/23* (2023.01)

(52) U.S. Cl.
CPC ........... *H04W 52/08* (2013.01); *H04L 5/0055* (2013.01); *H04W 52/54* (2013.01); *H04W 72/23* (2023.01)

(58) Field of Classification Search
CPC ..... H04W 52/08; H04W 72/23; H04W 52/54; H04L 5/0055
See application file for complete search history.

(56) References Cited

U.S. PATENT DOCUMENTS

2015/0351039 A1* 12/2015 Yang ........................ H04W 4/08 370/328
2021/0058873 A1* 2/2021 Gao ...................... H04W 80/02
2022/0174609 A1* 6/2022 Kang ..................... H04W 52/42
2022/0217654 A1* 7/2022 Kang .................. H04W 52/346
2022/0322416 A1* 10/2022 Papasakellariou .... H04L 5/0096
2022/0353892 A1* 11/2022 Cirik ..................... H04L 5/0096
2023/0143360 A1* 5/2023 Yao ..................... H04W 52/242 455/522
2023/0239096 A1* 7/2023 Go ........................ H04L 5/0098 370/329
2024/0064649 A1* 2/2024 Go ...................... H04W 52/262
2024/0172316 A1* 5/2024 Gao ....................... H04B 7/088

FOREIGN PATENT DOCUMENTS

WO WO-2023133754 A1 * 7/2023 ........... H04W 52/10

* cited by examiner

*Primary Examiner* — David Bilodeau
(74) *Attorney, Agent, or Firm* — QUALCOMM Incorporated

(57) ABSTRACT

Apparatuses and methods for indications of CLPC reset are described. An apparatus is configured to receive, from a network node, a MAC-CE or DCI that includes an indication of closed loop power control (CLPC) reset information. The apparatus is also configured to reset or maintain a CLPC adjustment state in response to receiving the indication of the CLPC reset information in the MAC-CE or the DCI. Another apparatus is configured to receive, from a network node, information for CLPC at the UE, where the information for CLPC indicates that a CLPC adjustment state is unaffected during a configuration for OLPC or a random-access at the UE. The other apparatus is also configured to maintain the CLPC adjustment state at the UE, during OLPC configuring or a random-access procedure at the UE, based on the information for CLPC received from the network node.

27 Claims, 14 Drawing Sheets

INDICATION OF CLPC RESET

TECHNICAL FIELD

The present disclosure relates generally to communication systems, and more particularly, to a to wireless communications utilizing closed loop power control.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus is configured to receive, from a network node, a medium access control (MAC) control element (MAC-CE) or downlink control information (DCI) that includes an indication of closed loop power control (CLPC) reset information. The apparatus is also configured to reset or maintain a CLPC adjustment state in response to receiving the indication of the CLPC reset information in the MAC-CE or the DCI.

In an aspect of the disclosure, a method, a computer-readable medium, and an apparatus are provided for wireless communication at a user equipment (UE). The apparatus is configured to receive, from a network node, information for CLPC at the UE, where the information for CLPC indicates that a CLPC adjustment state is unaffected during at least one of a configuration for open loop power control (OLPC) or a random-access at the UE. The apparatus is also configured to maintain the CLPC adjustment state at the UE, during at least one of OLPC configuring or a random-access procedure at the UE, based on the information for CLPC received from the network node.

In an aspect of the disclosure, a method, a computer-readable medium, and an apparatus are provided for wireless communication at a network node. The apparatus is configured to transmit, for a UE, a MAC-CE or DCI that includes an indication of CLPC reset information. The apparatus is also configured to receive, from the UE, uplink signaling corresponding to a CLPC adjustment state of the UE that is associated with the CLPC reset information.

In an aspect of the disclosure, a method, a computer-readable medium, and an apparatus are provided for wireless communication at a network node. The apparatus is configured to transmit, for a UE, information for CLPC at the UE, where the information for CLPC indicates that a CLPC adjustment state is unaffected during at least one of a configuration for open loop power control (OLPC) or a random-access at the UE. The apparatus is also configured to receive, from the UE and subsequent to at least one of the configuration for OLPC or the random-access at the UE, uplink signaling corresponding to the CLPC adjustment state that was unaffected during at least one of the configuration for OLPC or the random-access at the UE.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
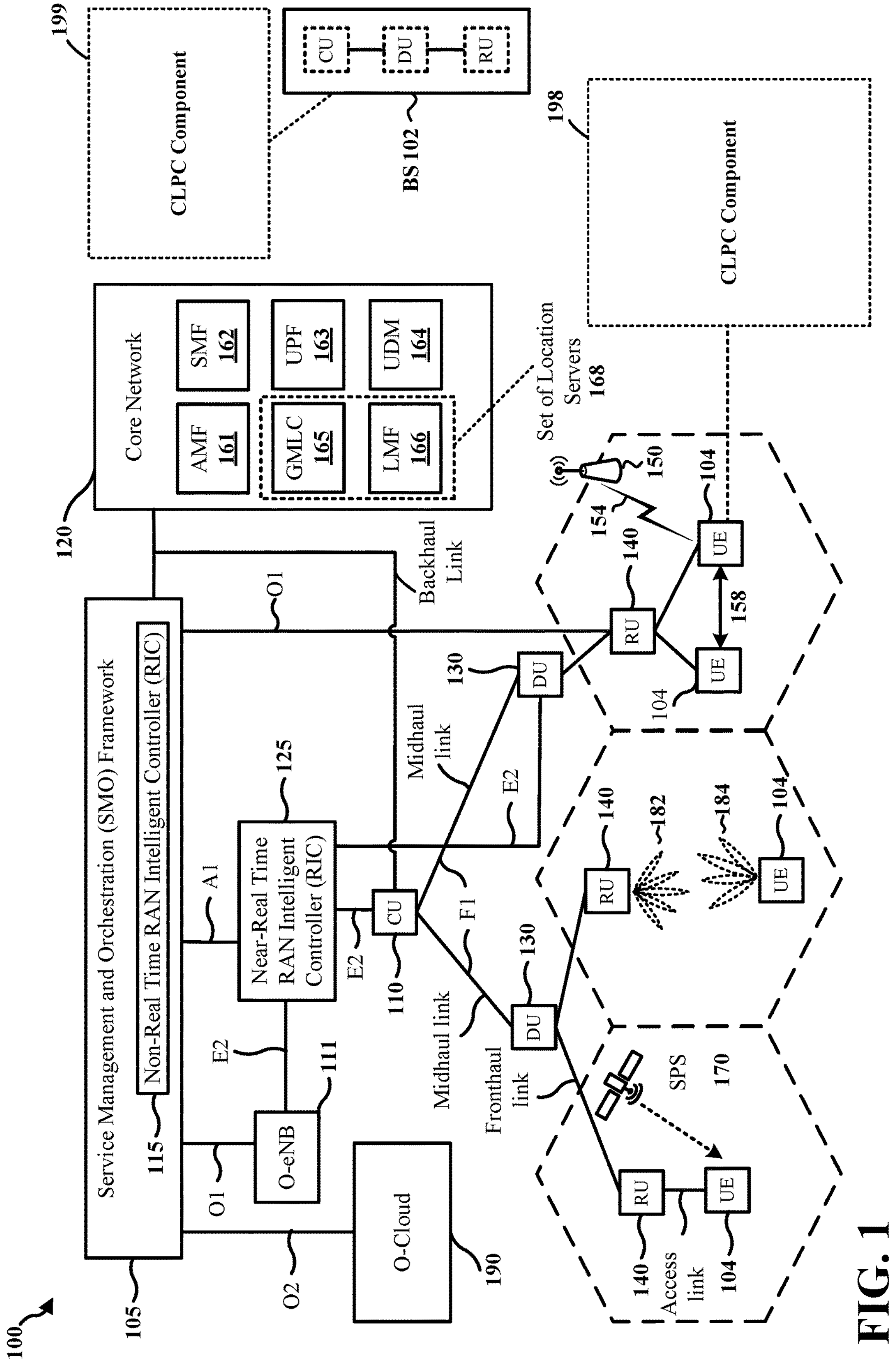
FIG. 1 is a diagram illustrating an example of a wireless communications system and an access network.

In a wireless network, such as a 5G NR network among other example networks, power control of a user equipment (UE) may be performed by a network node, such as a base station. Configured power control for a UE may include an loop power control (OLPC) part and a closed loop power control (CLPC) part. A CLPC reset at a UE may occur when an RRC configuration configures/re-configures a power offset and/or a path loss compensation parameter for OLPC, or after a random access procedure at a UE. However, a base station may also want to reset or alter the CLPC in other situations. Additionally, there may be scenarios in which communication is improved if the UE does not reset its CLPC due to existing procedures. For instance, when a power offset or a path loss compensation parameter for OLPC is configured/re-configured, or when a random access procedure is performed, it may improve communication if the UE to maintain its CLPC adjustment state based on its present accumulation via transmit power control (TPC). Aspects described herein for indications of CLPC reset provide enhancements and flexibility to the existing procedures for resetting CLPC adjustment state(s) for a UE in a wireless network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a CLPC component 198 ("component 198") that is configured to receive, from a network node, a medium access control (MAC) control element (MAC-CE) or downlink control information (DCI) that includes an indication of closed loop power control (CLPC) reset information. The CLPC component 198 is also configured to reset or maintain a CLPC adjustment state in response to receiving the indication of the CLPC reset information in the MAC-CE or the DCI. The CLPC component 198 may also be configured to maintain the CLPC adjustment state when the information in another DCI indicates for the UE to not reset the CLPC adjustment state. In some aspects, the CLPC component 198 is configured to receive, from a network node, information for CLPC at the UE, where the information for CLPC indicates that a CLPC adjustment state is unaffected during at least one of a configuration for open loop power control (OLPC) or a random-access at the UE. The CLPC component 198 is also configured to maintain the CLPC adjustment state at the UE, during at least one of OLPC configuring or a random-access procedure at the UE, based on the information for CLPC received from the network node. In such aspects, the CLPC component 198 may also be configured to receive, from the network node, a MAC-CE or DCI that includes an indication of CLPC reset information, and reset the CLPC adjustment state in response to receiving in the indication of the CLPC reset information in the MAC-CE or the DCI. In such aspects, the CLPC component 198 may also be configured to modify, for one or more of an OLPC configuration, reconfiguration, or update, at least one of a path loss compensation parameter or an offset parameter of an OLPC state and/or to transmit a MSG3 or a MSGA during the random-access procedure. In certain aspects, the base station 102 may include a CLPC component 199 ("component 199") that is configured to transmit, for a UE, a MAC-CE or DCI that includes an indication of CLPC reset information. The component 199 is also configured to receive, from the UE, uplink signaling corresponding to a CLPC adjustment state of the UE that is associated with the CLPC reset information. In some aspects, the CLPC component 199 is configured to transmit, for a UE, information for CLPC at the UE, where the information for CLPC indicates that a CLPC adjustment state is unaffected during at least one of a configuration for OLPC or a random-access at the UE. The CLPC component 199 is also configured to receive, from the UE and subsequent to at least one of the configuration for OLPC or the random-access at the UE, uplink signaling corresponding to the CLPC adjustment state that was unaffected during at least one of the configuration for OLPC or the random-access at the UE. Although the following description may be focused on 5G NR, the concepts described herein may be applicable to other similar areas, such as LTE, LTE-A, CDMA, GSM, and other wireless technologies.

Figures 2A, 2B, 2C, 2D:
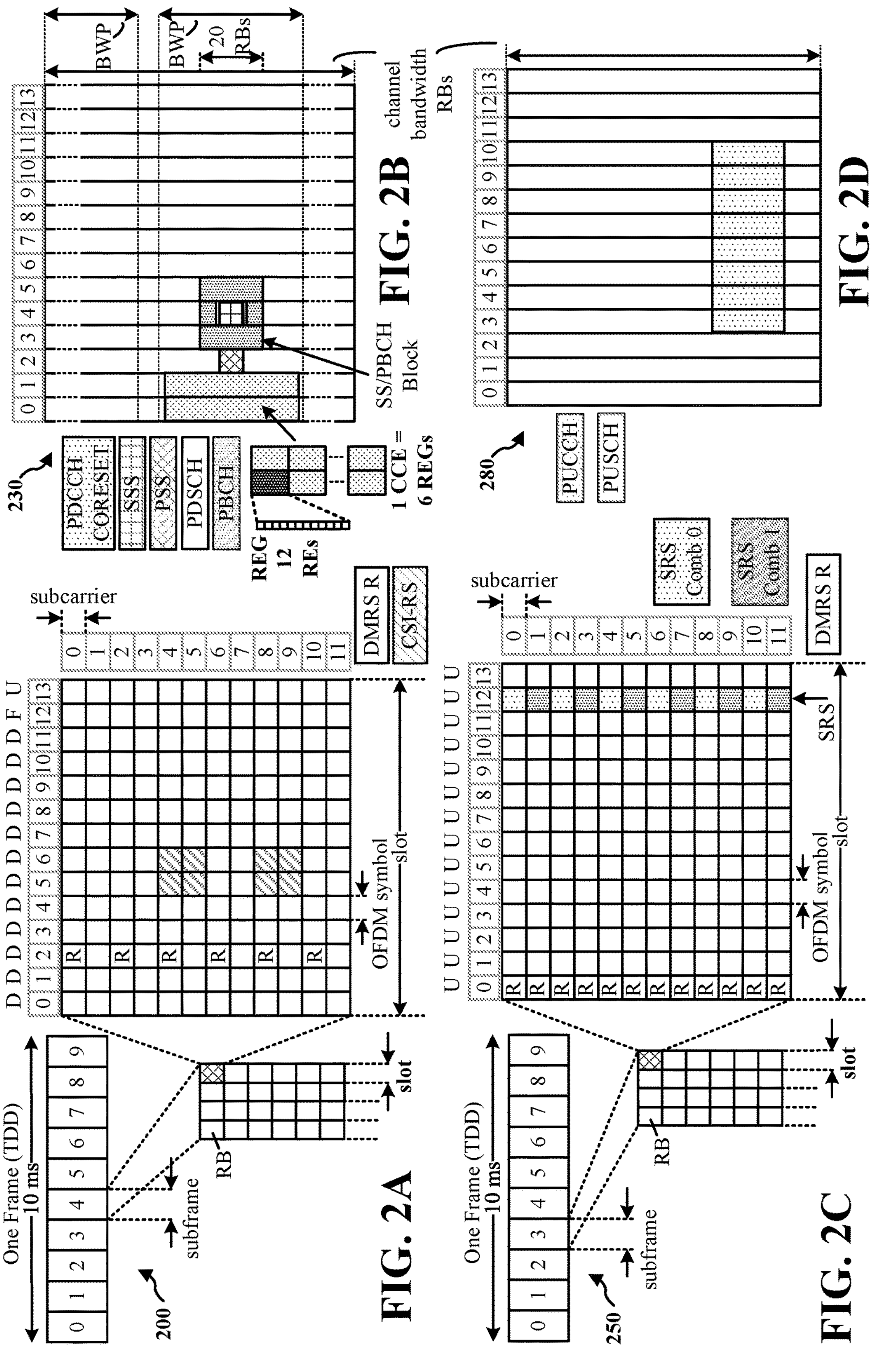
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$ [KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
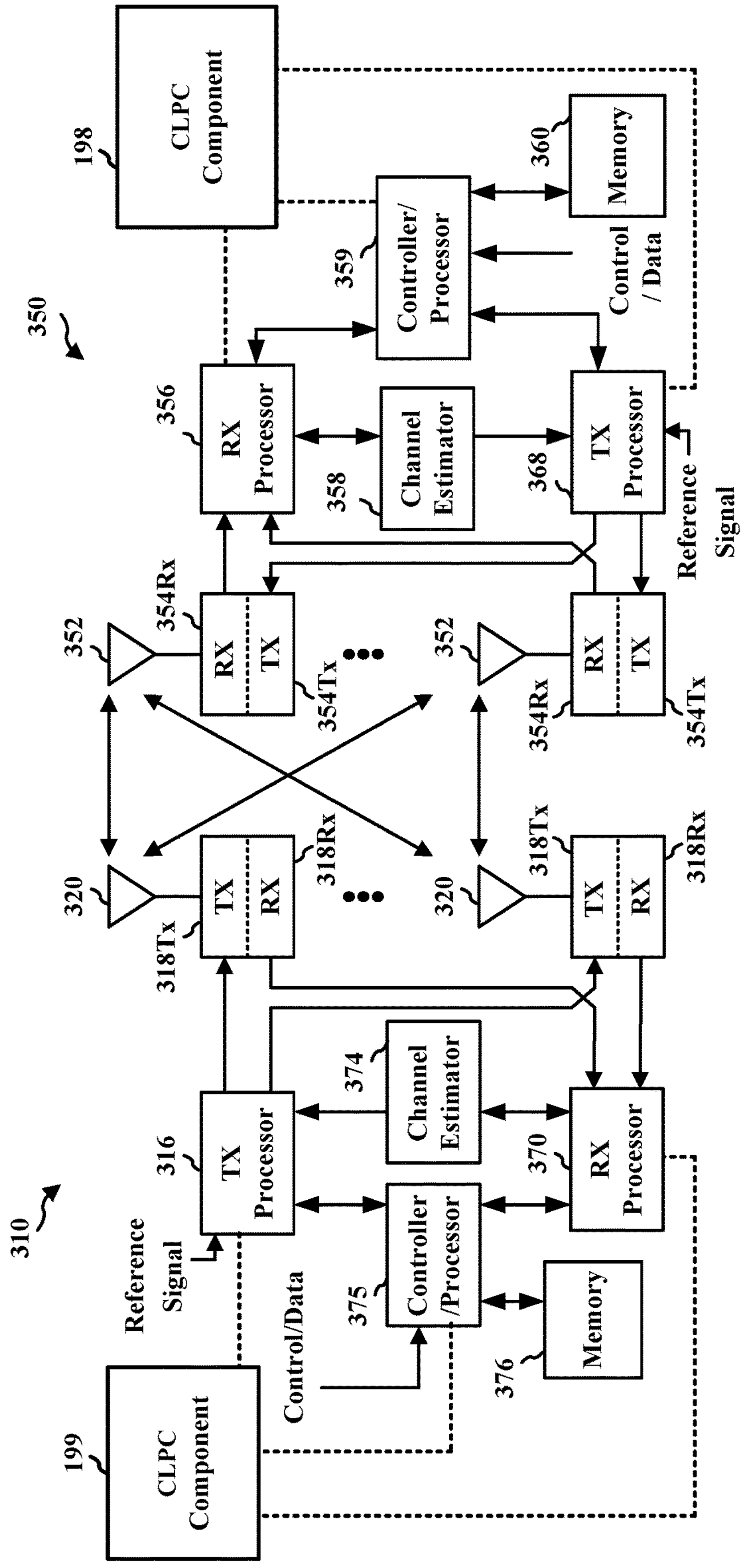
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the CLPC component 198 of FIG. 1. At least one of the TX processor 316, the RX processor 370, and the controller/processor 375 may be configured to perform aspects in connection with the CLPC component 199 of FIG. 1.

Aspects described herein for indications of CLPC reset provide enhancements and flexibility to the existing procedures for resetting CLPC adjustment state(s) for a UE in a wireless network, such as a 5G NR network among other example networks in which events cause CLPC resets. A CLPC reset may occur when an RRC configuration configures/re-configures a P0 (power offset) and/or an alpha (path loss compensation) parameter for OLPC, or after a random access procedure at a UE. However, a base station may also want to reset the CLPC in other situations. Additionally, there may be scenarios in which it communication can be improve if the UE does not reset CLPC due to existing procedures. For instance, when a P0 and/or an alpha parameter is configured/re-configured, or when a random access procedure is performed, it may be better for the UE to maintain its CLPC adjustment state based on its present accumulation via transmit power control (TPC).

In cases where a reset of CLPC adjustment state is desired by a base station outside of a P0 and/or an alpha parameter configuration/re-configuration, the aspects herein improve power efficiency by providing the capability to reset, or set to a different value, the CLPC adjustment state. For instance, if the interference profile across the network changes (e.g., due to more UEs or less UEs being active), the network may want to start from the OLPC setting and reset the CLPC. As one example, a cell-center UE (UE1) served by a TRP 1 may have a negative TPC accumulation as UL signal-to-noise and interference ratio (SINR) may be acceptable even with reduced power compared to the OLPC. A cell-edge UE (UE2) served by a TRP 2, but that may also be close to the TRP 1, may become active and transmit with a large Tx power (even with OLPC, e.g., due to large path loss (PL)). In this scenario, resetting the CLPC for UE1 may be helpful for power efficiency. As another example, UE1 may have a large positive '+' accumulation due to inter-cell interference created by UE2, and then UE2 may become inactive. In this scenario, resetting CLPC for UE1 may also helpful for power efficiency. As yet another example, a base station may send enough positive '+' or negative '−' TPC commands for different UEs to achieve an effective reset of the UE CLPC, but this may take multiple DCIs and a longer time to get the Tx power back to the OLPC setting, e.g., increases power and time overhead for both the UE and the network due to multiple transmissions. As still another example, the accumulation function may become un-synchronized between a UE and a base station (e.g., due to missing DCIs). In such a case, the base station may not have an accurate estimate of the actual applied CLPC at the UE. That is, the base station may not know how much the UE is deviating from the OLPC setting. In this case, the base station may want to reset the CLPC of the UE from time to time, e.g., when UE is in RRC connected mode for a long time.

In scenarios where a reset of CLPC adjustment state is not desired, as noted above, but may be part of a procedure or action, the aspects herein improve power efficiency by providing the capability to maintain the CLPC adjustment state of a UE(s). For instance, aspects provide for maintaining the CLPC adjustment state when a P0 and/or an alpha parameter is configured/re-configured, or when a random access procedure is performed. As an example, when a P0 and/or an alpha parameter is configured/re-configured, one closed loop index (l) may be associated with multiple P0 or alpha parameter values, thus when one of P0 or alpha values are reconfigured, the CLPC may be reset. This may also impact the other power control settings that use the same l but have their respective P0/alpha values unchanged. As an example of this, for PUSCH power control, each SRS resource indicator (SRI) codepoint of DCI may be associated with a set of power control parameters (e.g., P0 (offset), alpha (path loss compensation), PL-RS (path loss reference signal), closed loop index). This association may be given in RRC, and based on which SRI codepoint is indicated in the DCI, the corresponding power control parameters may be used for the PUSCH. If SRI codepoint 0 and 1 (e.g., corresponding to "sri-PUSCH-PowerControlId" 0 and 1) are both configured with closed loop index 0, but they are configured with different P0/alpha values (e.g., different "P0-PUSCH-AlphaSetId"), configuring a new P0/alpha for one of them may result in a CLPC reset even for the SRI codepoint with unchanged P0/alpha. The network/base station may wish to change the OLPC settings (P0/alpha) but still keep the CLPC accumulation at the UE (e.g., when the OLPC is configured to create a balance between received power and inter-cell interference, while CLPC is utilized for reacting to dynamic variations in channel or interference). As another example, for the case that a random-access procedure is performed (e.g., after MSG3/MSGA transmission), there may be multi-DCI based mTRP where the first closed loop index (l=0) may be used for PUSCH transmissions toward the first TRP (e.g., with a CORESETPoolIndex value 0) and the second closed loop index (l=1) may be used for PUSCH transmissions toward the second TRP (e.g., CORESETPoolIndex value 1). When a PRACH is transmitted toward the second TRP, the CLPC adjustment state may be reset for l=0 which corresponds to the first TRP. However, it may not be desired to disrupt or reset the CLPC adjustment state for the first TRP.

Accordingly, the aspects described herein for indications of CLCP reset provide for a base station and/or a UE to determine CLPC reset information and/or actions by which a UE more dynamically resets or maintains its CLPC adjustment state for specific scenarios which improves power and signaling efficiency. While various aspects may be described in the context of various scenarios for descriptive and illustrative purposes, aspects are not so limited and are applicable to other scenarios, etc., as would be understood by persons of skill in the relevant art(s) having the benefit of this disclosure.

Figure 4:
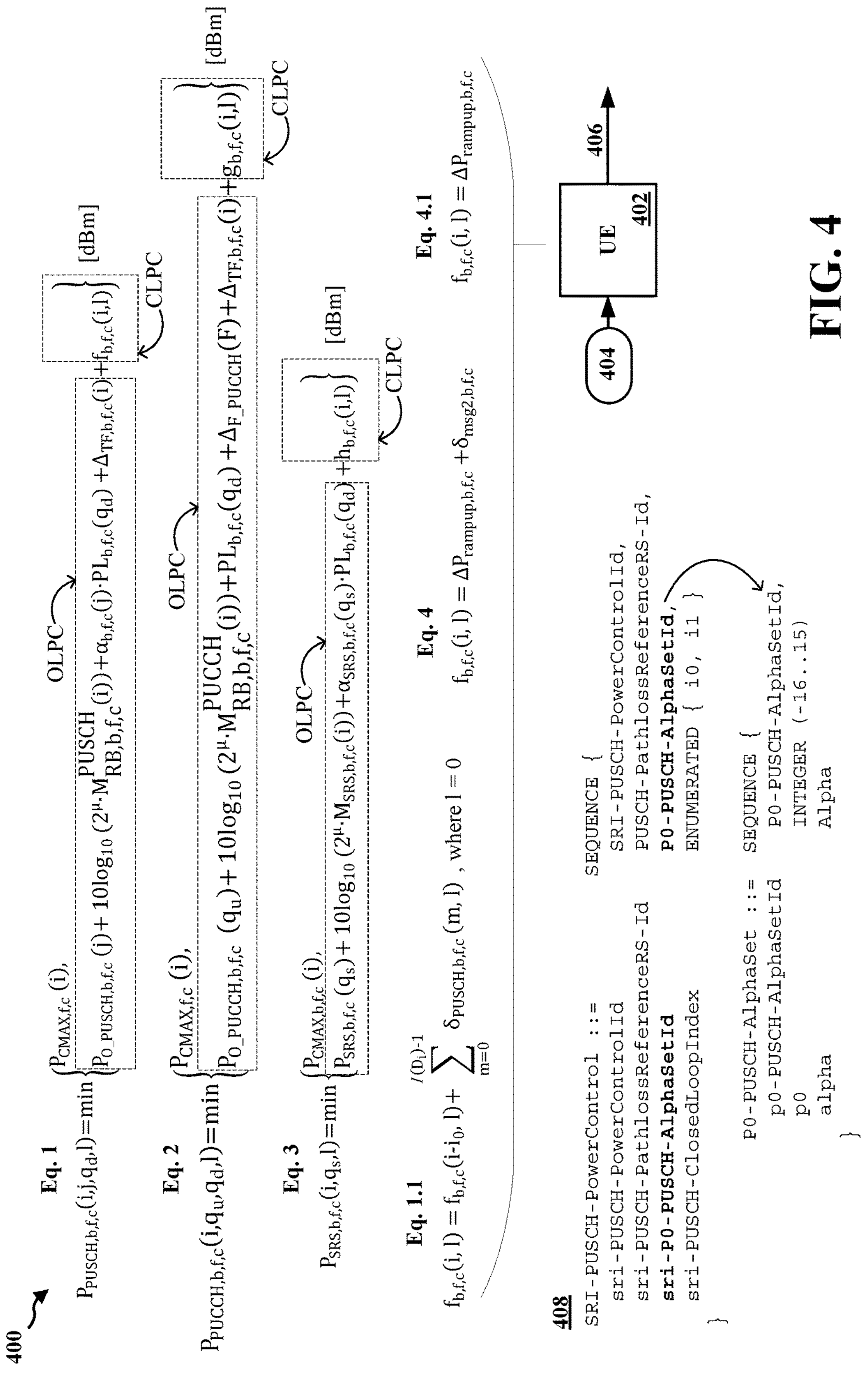
FIG. 4 is a diagram illustrating example power configurations at a UE, in accordance with various aspects of the present disclosure.

FIG. 4 is a diagram 400 illustrating example power configurations at a UE, in various aspects. Diagram 400 shows a UE 402 for which an associated event 404 (or action, procedure, etc.) causes a change in the CLPC adjustment state which alters the power of a transmission 406. The UE 402 may operate and/or transmit based on various power configurations for different signals and/or channels. Diagram 400 illustrates an Equation 1 associated with power control of a PUSCH, an Equation 2 associated with power control of a PUCCH, and an Equation 3 associated with power control of an SRS.

The power control for a PUSCH, as shown for Equation 1, may include a case for a maximum power, and also a case for configured power with an OLPC part and a CLPC part. The OLPC part may be mainly determined by configuration of the following parameters by the network/base station: P0, alpha ('α'), and a PL-RS (to determine PL). In addition, power may scale with a number of RBs, and an offset related to spectral efficiency may be added (Δ_TF). The CLPC may be determined based on TPC commands that may be given by DCI (e.g., other than for MSG3, which may be given by a random access response (RAR) PDSCH). TPC commands may be accumulated, e.g., as shown in Equation 1.1, which may be the default mode of operation for the UE 402, unless if the network/base station configures the UE 402 with absolute TPC value, in which case the TPC commands may be absolute and may not be accumulated. Two closed loop indices may be defined (l=0, 1) as corresponding to two CLPC adjustment states (e.g., when "twoPUSCH-PC-AdjustmentStates" is configured for the UE 402). The DCIs that indicate a TPC command may be scheduling DCI (e.g., scheduling a PUSCH), non-scheduling, or a group-common DCI (e.g., with a cyclic redundancy check (CRC) scrambled by "TPC-PUSCH-RNTI" (radio network temporary identifier)). In a case of two closed loop indices, the DCI may also indicate l (e.g., for scheduling DCI, this may be implicit through association of the PUSCH with a closed loop index; for group-common DCI, l may be explicitly indicated by the DCI). In cases of MSG3 (e.g., where RAR PDSCH indicates the TPC), the closed loop index may be fixed to l=0.

When a value of P0 or alpha is configured (or re-configured) via RRC, some configurations may include the CLPC being reset (e.g., to zero '0'). In cases of two closed loop indices for such a configuration, the CLPC reset may be based on the configured/re-configured P0 or alpha that is associated with a given 'l'. The association between P0/alpha and l may be defined based on whether they are used together for power control parameters of a given PUSCH (e.g., this association may be defined differently for configured grants (CGs) versus dynamic grants (DGs). When a MSG3 (4-step random access channel (RACH)) or a MSGA (2-step RACH) is transmitted as part of a random-access procedure, the closed loop power control adjustment f(i, l) for l=0 (first closed loop index) may be reset, in some configurations, according to Equation 4 (where $\Delta P_{rampup,b,f,c}$ is the total power ramp-up from the first to the last RACH attempt, and where $\delta_{msg2,b,f,c}$ is based on the TPC command indicated in the RAR message) after the UE 402 receives a RAR message in response to a PRACH transmission or a MsgA transmission. For MSGA-payload (in 2-step RACH), the same configuration may be applied, except that there may be no TPC command yet in this case, according to Equation 4.1.

The power control for a PUCCH, as shown for Equation 2, may include a case for a maximum power, and also a case for configured power with an OLPC part and a CLPC part. PUCCH OLPC may be similar to that of PUSCH described above expect that there may be no alpha parameter. Additionally, in some configurations, a list of P0 values may be separately configured for PUCCH, and a P0 may be used depending on the spatial relation information or TCI state that is applied to the PUCCH. The CLPC may be determined in various configurations based on TPC commands, e.g., via DCI. PUCCH CLPC may be similar to the CLPC of PUSCH, in configurations. For example, two closed loop indices may be defined (l=0, 1) as corresponding to two CLPC adjustment states (e.g., when "twoPUCCH-PC-AdjustmentStates" is configured). The DCIs that indicate a TPC command can be scheduling DCI (e.g., scheduling a PUCCH), non-scheduling, or a group-common DCI (e.g., with CRC scrambled by TPC-PUCCH-RNTI).

Various configurations for PUCCH may determine when the PUCCH CLPC is reset. In one example, when a value of P0 is configured (or reconfigured) by RRC, in the case of two closed loop indices, the l that is associated with the configured/reconfigured P0 value may be considered for reset. The association between P0 and l may be defined based on whether they are used together for power control parameters of a PUCCH, and in such a case, the CLPC reset value may be zero ('0'). Another example may be similar to the MSG3 (4-step RACH) or MSGA (2-step RACH) being transmitted as part of a random-access procedure as described above, when MSG3/MSGA is transmitted, the first closed loop index l=0 for both PUSCH and PUCCH may be reset. Yet another example may reset 28 symbols after a beam failure recovery (BFR) response (e.g., a first PDCCH reception in a search space set provided by "recoverySearchSpaceId") for a contention free random access (CFRA) based BFR. In such a case, the CLPC for the first closed loop index l=0 may be reset to the total power ramp-up from the first to the last RACH attempt plus the TPC in the PDCCH reception.

The power control for a SRS, as shown for Equation 3, may include a case for a maximum power, and also a case for configured power with an OLPC part (e.g., similar to PUSCH) and a CLPC part. In one example, if the "srs-PowerControlAdjustmentStates" indicates a same CLPC adjustment state for SRS transmissions and PUSCH transmissions, then h(.) in the CLPC part of Equation 3 may be the same as f(.) in the PUSCH for Equation 1, and thus, when f(.) is reset, as in Equation 1, the h(.) is also reset in Equation 3. In another example, if the PUSCH and the SRS have separate power control adjustment states, then only l=0 (one closed loop index) may be defined currently, and thus, when the CLPC is reset for the following configurations, there may be no requirement to know for which l the reset is applied: (1) when a value of P0 or alpha is configured (or reconfigured) by RRC, and (2) when a MSG3 is transmitted by the UE 402.

As noted above, there may be configurations in which the network/base station may wish to change the OLPC settings (e.g., P0/alpha) at the UE 402 via the event 404 but still keep the current accumulation for the CLPC adjustment state at the UE 402. That is, while in some configurations, such as a configuration 408 applied during the event 404, where a reset of change the OLPC settings (e.g., P0/alpha) at the UE 402 also resets the CLPC adjustment state, aspects herein also provide for the UE 402 to be configured to maintain the CLPC adjustment state for PUSCH, PUCCH, and/or SRS signaling, as described herein.

Figure 5:
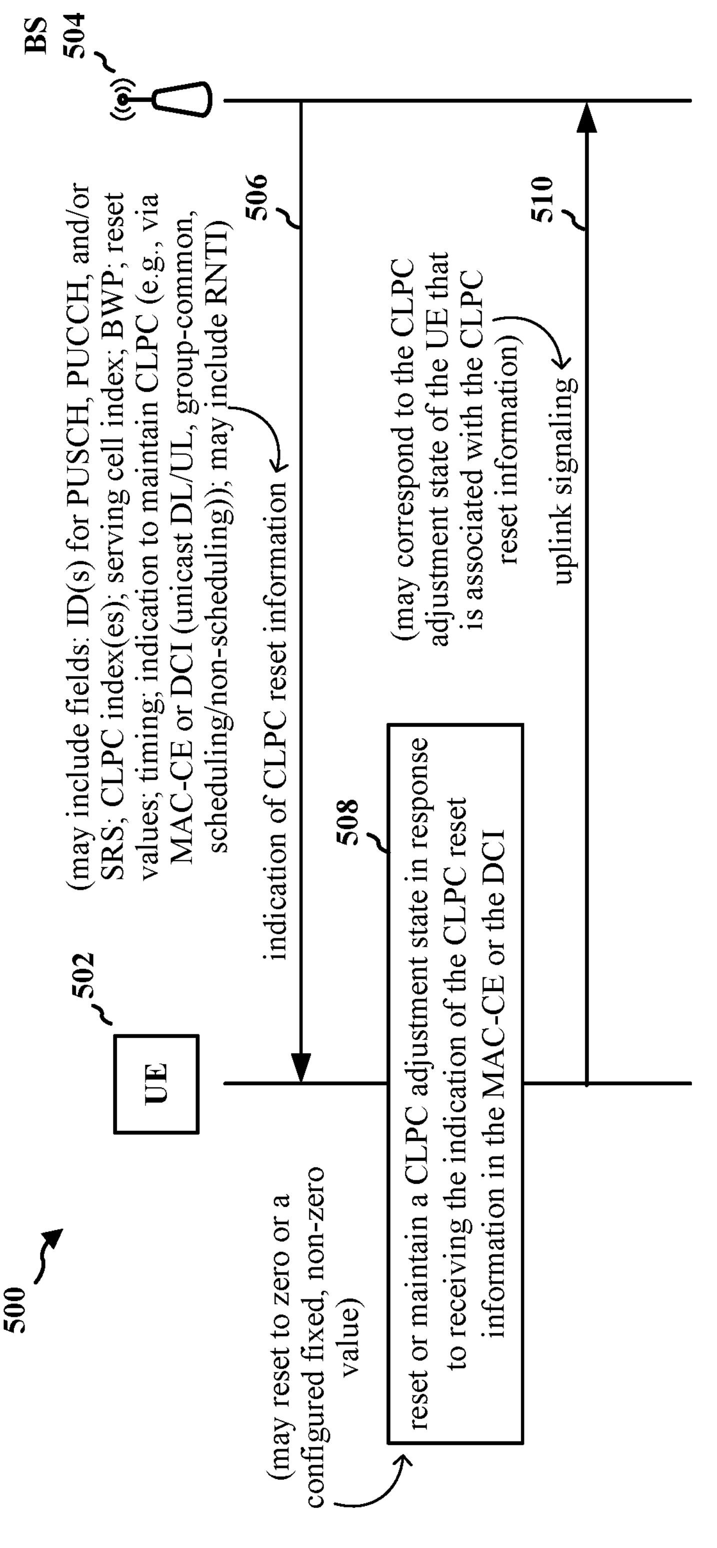
FIG. 5 is a call flow diagram for wireless communications, in accordance with various aspects of the present disclosure.

FIG. 5 shows a call flow diagram 500 for wireless communications, in various aspects. Call flow diagram 500 illustrates indications of CLPC reset in wireless communications, and illustrates configuring a UE 502 for resetting or maintaining its CLPC adjustment state(s) via configurations from a network node (a base station 504, such as a gNB or other type of base station, by way of example, as shown), in various aspects. Aspects described for the base station 504 may be performed by the base station in aggregated form and/or by one or more components of the base station in disaggregated form. Additionally, or alternatively, the CLPC adjustment state resetting/maintenance may be performed by a UE 502 autonomously in addition to, or in lieu of, configurations provided to from the base station 504.

In the illustrated aspect, the UE 502 receives an indication 506 of CLPC reset information that is transmitted by the base station 504 or one or more components thereof. The indication 506 of CLPC reset information may be received by the UE 502 via a MAC-CE or DCI from the base station 504. The indication 506 of CLPC reset information may include one or more fields: an identifier(s) for PUSCH, PUCCH, and/or SRS, a CLPC index(es), a serving cell index, a BWP, a reset value(s), timing, a RNTI, an indication to reset/maintain the CLPC, and/or the like. In aspects, when provided via DCI, the DCI may be a unicast DL/UL DCI, a group-common DCI, a scheduling DCI, a non-scheduling DCI, and/or the like. The indication 506 of the CLPC reset information may include at least two indices associated with the CLPC adjustment state in cases for the inclusion of at least two CLPC adjustment states respectively associated with the CLPC indices. In such a configuration, the indication 506 of CLPC reset information indicates, via at least one of the at least two CLPC indices, at least one of the at least two CLPC adjustment states to be reset or maintained.

The UE 502, at 508, may be configured to reset or maintain a CLPC adjustment state in response to receiving the indication 506 of the CLPC reset information in the MAC-CE or the DCI from the base station 504. In aspects, the CLPC adjustment state may include one or more CLPC adjustment states associated with respective indices, as described herein. The UE 502 may be configured to reset or maintain (at 508) based on the information indicated/included in the indication 506. For example, the resetting or maintaining (at 508) may be associated with a specific channel/signaling (e.g., for PUSCH, PUCCH, and/or SRS), which may be based on a received RNTI, for one or more CLPC indices, for an indicated serving cell index, and/or for an indicated BWP, where such combinations are reset/maintained based on an indicator in the indication 506 to reset or maintain a given, associated CLPC adjustment state. In aspects, the UE 502 may be configured to reset (at 508) one or more CLPC adjustment states to a value of zero, or to a fixed, non-zero value indicated by the indication 506 or by a pre-configured parameter (RRC configuration prior to the indication 506), where the reset may occur at a timing indicated by the indication 506, as described in further detail below.

Subsequent to the CLPC adjustment state being reset or maintained by the UE 502 at 508 according to the indicated timing, uplink signaling 510 may be transmitted by the UE 502 to the base station 504. The uplink signaling 510 may include power characteristics that correspond to the CLPC adjustment state of the UE that is associated with the CLPC reset information (e.g., either as reset or maintained). For example, the uplink signaling 510 may be for PUSCH, PUCCH, and/or SRS signaling that is reset/maintained by the UE 502 at 508 based on the indication 506 of CLPC reset information.

Figure 6:
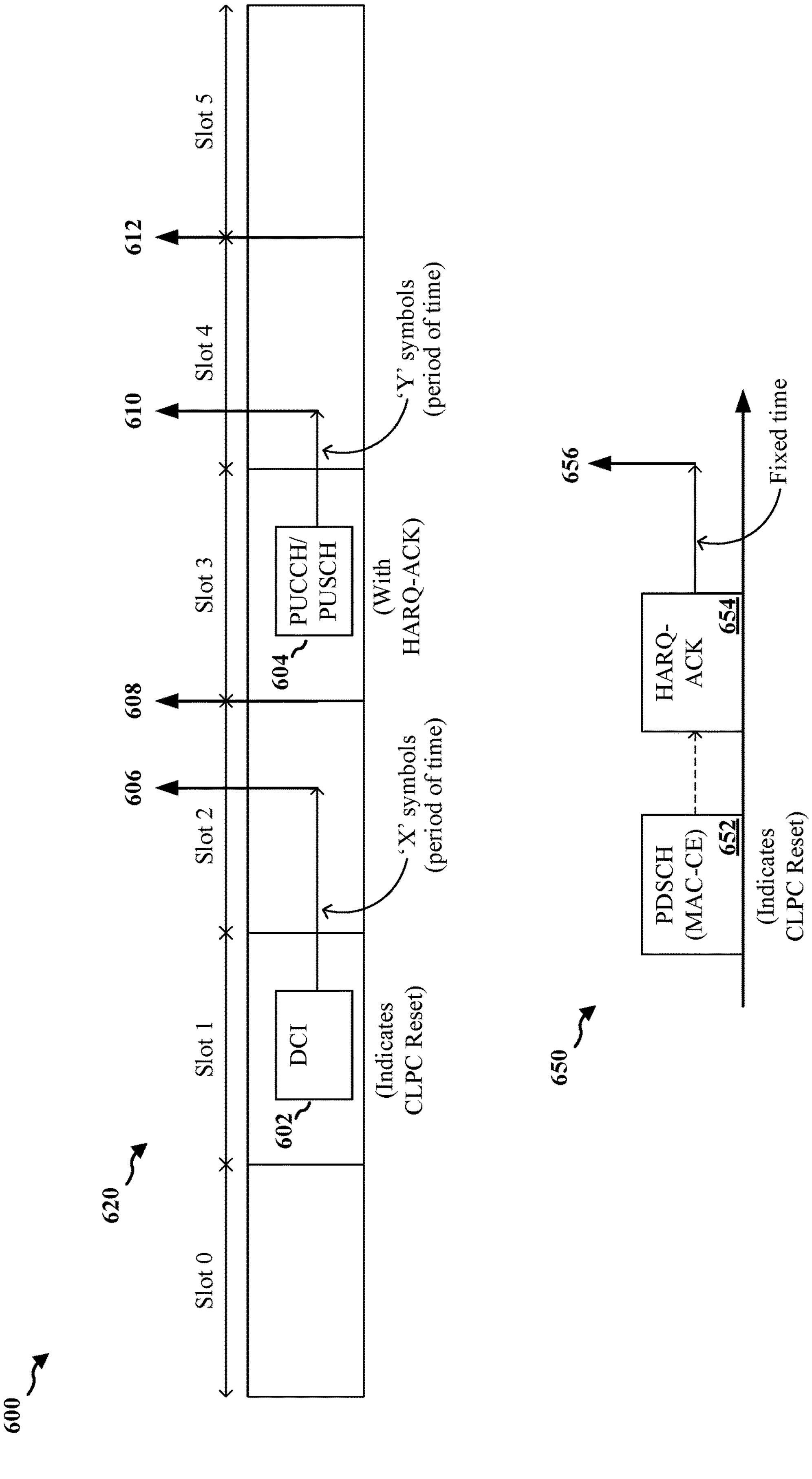
FIG. 6 is a diagram for reset timing of a closed loop power control (CLPC) adjustment state(s) for wireless communications at a UE, in accordance with various aspects of the present disclosure.

FIG. 6 is a diagram 600 for reset timing of a CLPC adjustment state(s) for wireless communications at a UE, in accordance with various aspects of the present disclosure. Diagram 600 illustrates a timing configuration 620 for DCI-based CLPC adjustment state resets, and a timing configuration 650 for MAC-CE-based CLPC adjustment state resets. Diagram 600 is shown with reference to a number of slots (slot 0 through slot 5, by way of example) for timing configuration 620, and time for timing configuration 650.

As noted herein, at least one field in a DCI, or the RNTI scrambled with the CRC of the DCI, may indicates whether to reset the CLPC adjustment state, and additional fields, without limitation, in the DCI can also be included to indicate that the CLPC reset is for a channel(s) among PUSCH/PUCCH/SRS, and that the CLPC is for a designated closed loop index(es). Timing configuration 620 for DCI-based CLPC adjustment state resets shows DCI 602, which indicates a CLPC adjustment state reset, at slot 1, and a PUSCH/PUCCH transmission 604 with a HARQ-ACK, at slot 3. For various sub-configurations of DCI-based CLPC adjustment state resets, a reset time 606, a reset time 608, a reset time 610, and a reset time 612 are shown. As noted above with respect to FIG. 5, a DCI may include one or more fields for the indication of CLPC adjustment state reset parameters. One example is a field(s) for the timing at which CLPC adjustment state resets may take place.

In one example, a DCI 602 field for such timing may indicate for the UE to reset the CLPC adjustment state after a period of time subsequent to a last symbol of the DCI, as shown for the reset time 606. That is, the reset time 606 may be a period of time period/a number 'X' of symbols (e.g., related to UE processing time) after the last symbol of the DCI 602 (shown as being in slot 2). In another example, a DCI 602 field for such timing may indicate for the UE to reset the CLPC adjustment state after a period of time subsequent to a start of a next slot after a last symbol of the DCI 602, as shown for the reset time 608. That is, the reset time 608 may be the first slot that is after a time period/a number 'X' of symbols after the last symbol of the DCI 602 (e.g., similar to reset time 606 but quantized to the next slot so that the CLPC adjustment state is reset at slot boundary, shown as the end of slot 2 and the beginning of slot 3). In a further example, a DCI 602 field for such timing may indicate for the UE to reset the CLPC adjustment state after a period of time subsequent to a last symbol of a HARQ-ACK transmission (e.g., via PUCCH/PUSCH transmission 604) responsive to the DCI 602, as shown for the reset time 610. That is, the reset time 610 may be after a time period/a number 'Y' of symbols (e.g., may be 0 (zero), RRC-configured, or based on UE capability) after the last symbol of the PUCCH/PUSCH transmission 604 (with HARQ-Ack) transmitted in response to the DCI 602 (shown as being in slot 4, way of example). Reset time 610 may be applicable if the DCI 602 triggers a HARQ-Ack (e.g., DL DCI format are used). In still another example, a DCI 602 field for such timing may indicate for the UE to reset the CLPC adjustment state after a period of time subsequent to a start of a next slot after a last symbol of a HARQ-ACK transmission responsive to the DCI 602, as shown for the reset time 612. That is, the reset time 612 may be after the first slot that is after a time period/a number 'Y' of symbols (e.g., may be zero '0', RRC-configured, or based on UE capability) after the last symbol of the PUCCH/PUSCH transmission 604 (with HARQ-Ack) transmitted in response to the DCI 602 (e.g., similar to reset time 610 but quantized to the next slot so that the CLPC adjustment state is reset at slot boundary, shown as the end of slot 4 and the beginning of slot 5).

The DCI 602 (as well as a DCI that includes indication 506 in FIG. 5) may be of various formats, in aspects. For example, the DCI 602 may be a unicast DL DCI (e.g., DCI formats 1_1/1_2) that may be used when the DCI may or not may not be a scheduling DCI (and may also schedule a PDSCH or not). As another example, the DCI 602 may be a unicast UL DCI (e.g., DCI formats 0_1/0_2) that may be used when the DCI may or not may not be a scheduling DCI (and may also schedule a PUSCH or not). In these two examples, when the DCI 602 is not scheduling a PDSCH/PUSCH, some existing fields (e.g., for frequency domain resource allocation (FDRA)/new data indicator (NDI)/redundancy version (RV), etc.) may be used to validate that the DCI does not schedule a PDSCH/PUSCH, and another existing field may be used to indicate whether to reset CLPC adjustment state or not. In still another example, the DCI 602 may be a group-common DCI (e.g., DCI format 2_x) that may be used where the DCI can be received by multiple UEs, which improves the flexibility for power efficient configurations of aspects when the CLPCs for multiple UEs are to be reset. In additional example, the RNTI of a given DCI format may be specified for this purpose. For instance, a limited number (e.g., one or more) of existing RNTIs may be applicable for the DCI 602 (e.g., C-RNTI in first two examples above), or a new RNTI may be configured for the DCI format (e.g., for group-common DCI cases), or multiple different RNTIs may be configured for CLPC resets on different channels (PUSCH/PUCCH/SRS).

Timing configuration 650 for MAC-CE-based CLPC adjustment state resets shows a MAC-CE PDSCH 652, which indicates a CLPC adjustment state reset, and which is followed by a HARQ-ACK 654. For example, when a MAC-CE-indicates a CLPC adjustment state reset, a UE may reset the CLPC adjustment state after a fixed time (e.g., 3 ms, or another time period) after the HARQ-ACK 654 corresponding to the PDSCH that includes the MAC-CE (the MAC-CE PDSCH 652), as shown for a reset time 656. The MAC-CE PDSCH 652 may also include multiple fields related to the CLPC adjustment state reset. Such fields may include, without limitation, fields for a serving cell index, a BWP identifier, a channel(s) indicator among PUSCH/PUCCH/SRS for which CLPC reset is applied, a closed loop index for which CLPC reset is, and/or the like.

Figure 7:
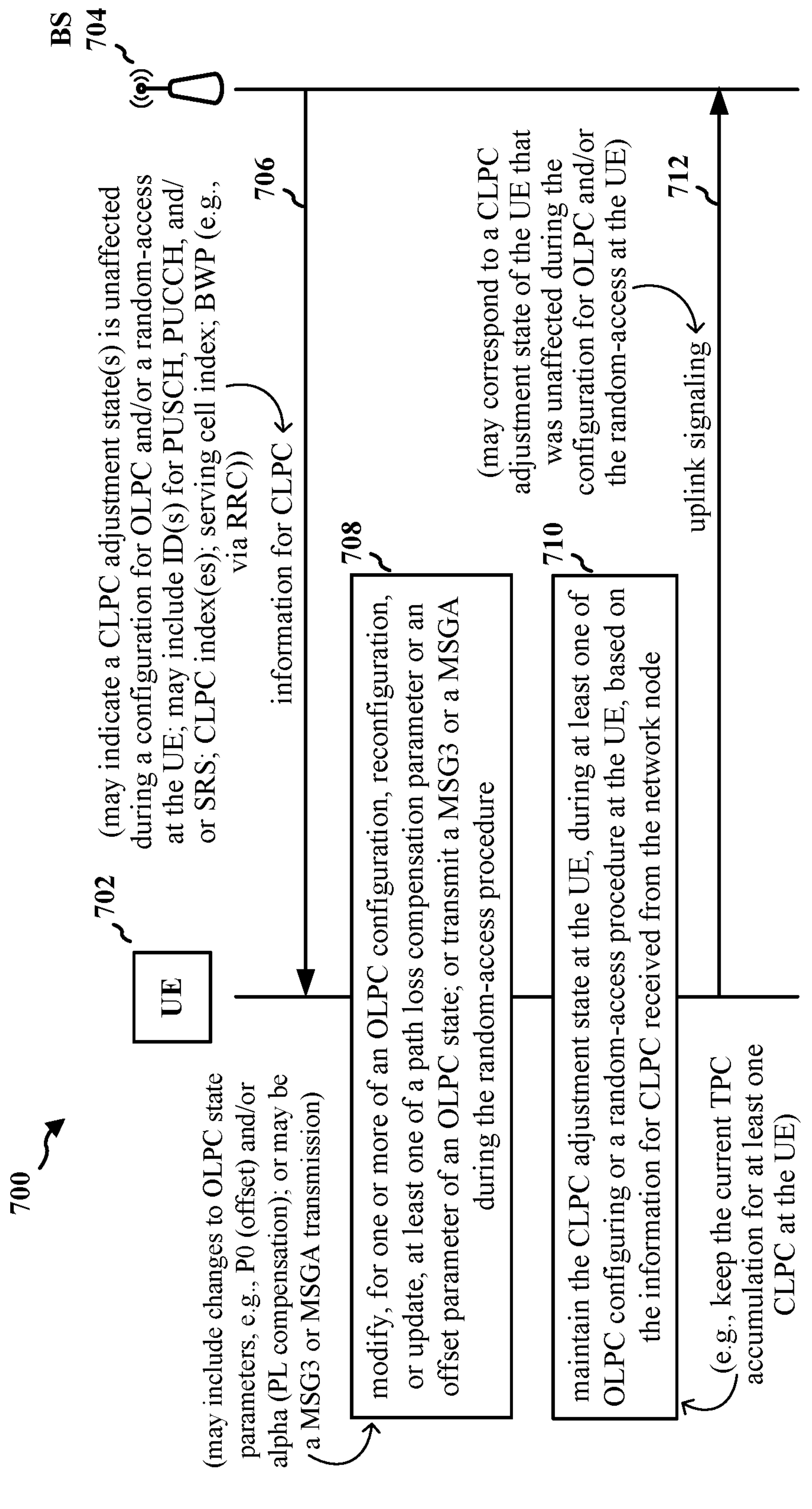
FIG. 7 is a call flow diagram for wireless communications, in accordance with various aspects of the present disclosure.

FIG. 7 is a call flow diagram 700 for wireless communications, in accordance with various aspects of the present disclosure. Call flow diagram 700 illustrates indications of CLPC reset in wireless communications, and illustrates configuring a UE 702 for resetting or maintaining its CLPC adjustment state(s) via configurations from a network node (a base station 704, such as a gNB or other type of base station, by way of example, as shown), in various aspects. Aspects described for the base station 704 may be performed by the base station in aggregated form and/or by one or more components of the base station in disaggregated form. Additionally, or alternatively, the CLPC adjustment state resetting/maintenance may be performed by a UE 702 autonomously in addition to, or in lieu of, configurations provided to from the base station 704.

In the illustrated aspect, the UE 702 may receive information 706 for CLPC that is transmitted by the base station 704 or one or more components thereof. The information 706 for CLPC may be received by the UE 702 via a RRC signaling from the base station 704. The information 706 for CLPC may include, without limitation, one or more fields: a field to indicate the CLPC adjustment state is unaffected during for OLPC configuration/re-configuration and/or for random access procedures at the UE, an identifier(s) for PUSCH, PUCCH, and/or SRS, a CLPC index(es), a serving cell index, a BWP, and/or the like. The information 706 for CLPC may include at least two indices associated with the CLPC adjustment state in cases for the inclusion of at least two CLPC adjustment states respectively associated with the CLPC indices. In such a configuration, the information 706 for CLPC indicates, via at least one of the at least two CLPC indices, at least one of the at least two CLPC adjustment states to be maintained during an OLPC configuration/re-configuration and/or a random access procedure at the UE 702.

The UE 702, at 708, may be configured to modify, for one or more of an OLPC configuration, reconfiguration, or update, at least one of a path loss compensation parameter or an offset parameter of an OLPC state, or may be configured to transmit a MSG3 or a MSGA during the random-access procedure at the UE 702. For example, as described above with respect to FIG. 4 (e.g., in the context of the UE 402 for which an associated event 404 (or action, procedure, etc.) causes a change in the CLPC adjustment state which alters the power of a transmission 406), OLPC state parameters may be configured, re-configured, updated, and/or the like. Changes to OLPC state parameters, e.g., P0 (offset) and/or alpha (PL compensation), may attempt to cause a reset to CLPC adjustment states at the UE 702. Similarly, during a random-access procedure at the UE 702, the UE 702 may be configured to transmit a MSG3 or MSGA, which may attempt to cause a reset to CLPC adjustment states at the UE 702.

In association with the modifying or transmitting at 708 by the UE 702, the UE 702 may also be configured at 710 to maintain the CLPC adjustment state at the UE 702, during at least one of OLPC configuring or a random-access procedure (at 708) at the UE, based on the information 706 for CLPC received from the base station 704 (e.g., from a network node). That is, the UE 702 may be configured to override or ignore procedures and/or the like that would reset or alter the CLPC adjustment state at the UE 702 during an OLPC alteration or a random-access procedure (e.g., at 708). Thus, the UE 702 may be configured to keep the current TPC accumulation for at least one CLPC at the UE 702.

Subsequent to the CLPC adjustment state being maintained (e.g., unaffected) by the UE 702 at 710, uplink signaling 712 may be transmitted by the UE 702 to the base station 704. The uplink signaling 712 may include power characteristics that correspond to the CLPC adjustment state of the UE that is associated with the unaffected/maintained CLPC adjustment state (e.g., at 710). For example, the uplink signaling 712 may be for PUSCH, PUCCH, and/or SRS signaling that has a CLPC adjustment state for which the TPC accumulation is maintained by the UE 702 at 712 based on the information 706 for CLPC.

Subsequent to the uplink signaling 712 being transmitted, call flow diagram 700 may be followed by one or more parts of call flow diagram 500 (FIG. 5) by which the CLPC adjustment state of the UE 702 may be expressly, and dynamically, reset or altered, as described for FIG. 5 above.

Figure 8:
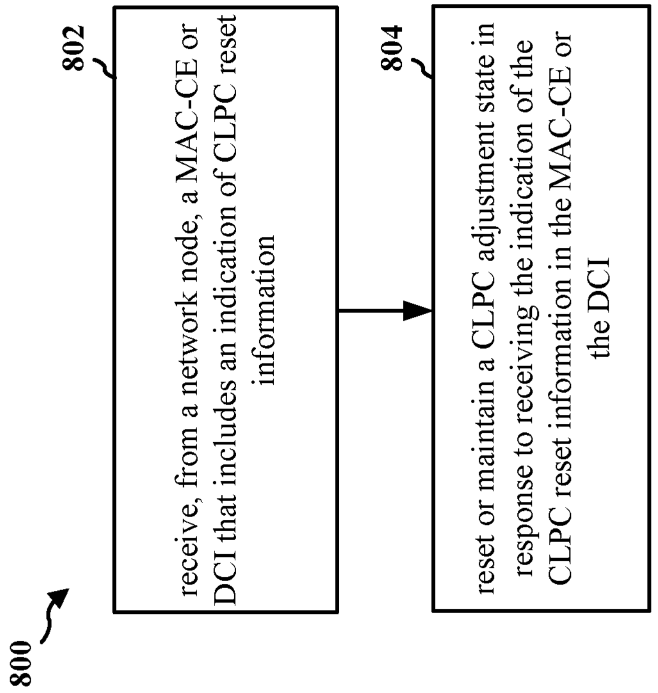
FIG. 8 is a flowchart of a method of wireless communication, in accordance with various aspects of the present disclosure.

FIG. 8 is a flowchart 800 of a method of wireless communication, in accordance with various aspects of the present disclosure. The method may be performed by a UE (e.g., the UE 104, 402, 502, 702; the apparatus 1304). At 802, the UE is configured to receive, from a network node, a MAC-CE or DCI that includes an indication of CLPC reset information. In some aspects, 802 may be performed by the component 198. For instance, with reference to FIGS. 5, 6, the UE 502 is configured to receive an indication 506 of CLPC reset information that is transmitted by the base station 504 or one or more components thereof. The indication 506 of CLPC reset information may be received by the UE 502 via a MAC-CE (e.g., 652 in FIG. 6) or a DCI (e.g., 602 in FIG. 6) from the base station 504. The indication 506 of CLPC reset information may include one or more fields: an identifier(s) for PUSCH, PUCCH, and/or SRS, a CLPC index(es), a serving cell index, a BWP, a reset value(s), timing, a RNTI, an indication to reset/maintain the CLPC, and/or the like. In aspects, when provided via DCI (e.g., 602 in FIG. 6), the DCI (e.g., 602 in FIG. 6) may be a unicast DL/UL DCI, a group-common DCI, a scheduling DCI, a non-scheduling DCI, and/or the like. The indication 506 of the CLPC reset information may include at least two indices associated with the CLPC adjustment state in cases for the inclusion of at least two CLPC adjustment states respectively associated with the CLPC indices. In such a configuration, the indication 506 of CLPC reset information indicates, via at least one of the at least two CLPC indices, at least one of the at least two CLPC adjustment states to be reset or maintained.

At 804, the UE is configured to reset or maintain a CLPC adjustment state in response to receiving the indication of the CLPC reset information in the MAC-CE or the DCI. In some aspects, 804 may be performed by the component 198. For instance, with reference again to FIGS. 6, 7, The UE 502, at 508, may be configured to reset or maintain a CLPC adjustment state in response to receiving the indication 506 of the CLPC reset information in the MAC-CE (e.g., 652 in FIG. 6) or the DCI (e.g., 602 in FIG. 6) from the base station 504. In aspects, the CLPC adjustment state may include one or more CLPC adjustment states associated with respective indices, as described herein. The UE 502 may be configured to reset or maintain (at 508) based on the information indicated/included in the indication 506. For example, the resetting or maintaining (at 508) may be associated with a specific channel/signaling (e.g., for PUSCH, PUCCH, and/or SRS), which may be based on a received RNTI, for one or more CLPC indices, for an indicated serving cell index, and/or for an indicated BWP, where such combinations are reset/maintained based on an indicator in the indication 506 to reset or maintain a given, associated CLPC adjustment state. In aspects, the UE 502 may be configured to reset (at 508) one or more CLPC adjustment states to a value of zero, or to a fixed, non-zero value indicated by the indication 506, where the reset may occur at a timing (e.g., reset times 606, 608, 610, 612 (DCI); 656 (MAC-CE); in FIG. 6) indicated by the indication 506. Subsequent to the CLPC adjustment state being reset (e.g., reset times 606, 608, 610, 612 (DCI); 656 (MAC-CE); in FIG. 6) or maintained by the UE 502 at 508 according to the indicated timing (e.g., reset times 606, 608, 610, 612 (DCI); 656 (MAC-CE); in FIG. 6), uplink signaling 510 may be transmitted by the UE 502 to the base station 504. The uplink signaling 510 may include power characteristics that correspond to the CLPC adjustment state of the UE 502 that is associated with the CLPC reset information (e.g., either as reset or maintained). For example, the uplink signaling 510 may be for PUSCH, PUCCH, and/or SRS signaling that is reset/maintained by the UE 502 at 508 based on the indication 506 of CLPC reset information.

Figure 9:
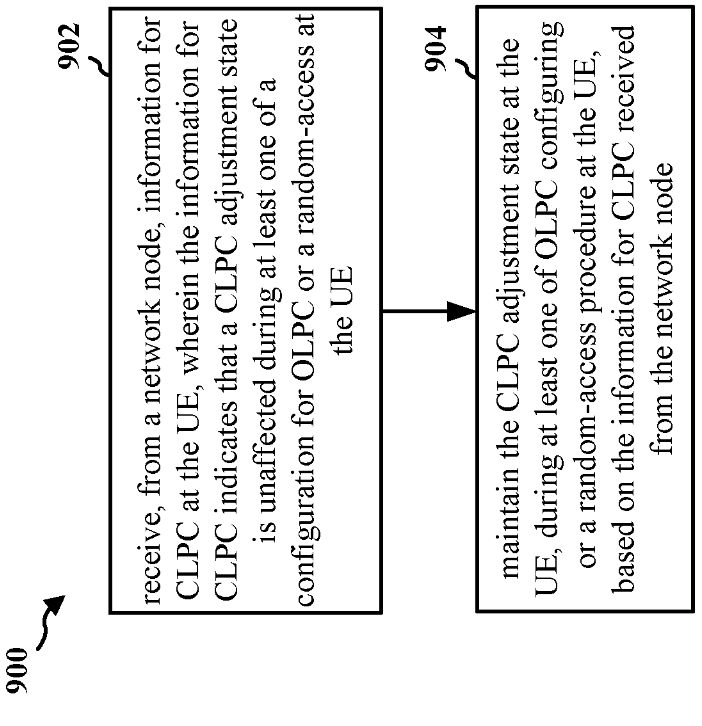
FIG. 9 is a flowchart of a method of wireless communication, in accordance with various aspects of the present disclosure.

FIG. 9 is a flowchart 900 of a method of wireless communication, in accordance with various aspects of the present disclosure. The method may be performed by a UE (e.g., the UE 104, 402, 502, 702; the apparatus 1304). At 902, the UE may be configured to receive, from a network node, information for CLPC at the UE, wherein the information for CLPC indicates that a CLPC adjustment state is unaffected during at least one of a configuration for OLPC or a random-access at the UE. In some aspects, 902 may be performed by the component 198. For instance, with reference to FIG. 7, the UE 702 may receive information 706 for CLPC that is transmitted by the base station 704 or one or more components thereof. The information 706 for CLPC may be received by the UE 702 via a RRC signaling from the base station 704. The information 706 for CLPC may include, without limitation, one or more fields: a field to indicate the CLPC adjustment state is unaffected during for OLPC configuration/re-configuration and/or for random access procedures at the UE, an identifier(s) for PUSCH, PUCCH, and/or SRS, a CLPC index(es), a serving cell index, a BWP, and/or the like. The information 706 for CLPC may include at least two indices associated with the CLPC adjustment state in cases for the inclusion of at least two CLPC adjustment states respectively associated with the CLPC indices. In such a configuration, the information 706 for CLPC indicates, via at least one of the at least two CLPC indices, at least one of the at least two CLPC adjustment states to be maintained during an OLPC configuration/re-configuration and/or a random access procedure at the UE 702.

At 904, the UE is configured to reset or maintain a CLPC adjustment state in response to receiving the indication of the CLPC reset information in the MAC-CE or the DCI. In some aspects, 904 may be performed by the component 198. For instance, with reference again to FIG. 7, in association with the modifying or transmitting at 708 by the UE 702, the UE 702 may also be configured at 710 to maintain the CLPC adjustment state at the UE 702, during at least one of OLPC configuring or a random-access procedure (at 708) at the UE, based on the information 706 for CLPC received from the base station 704 (e.g., from a network node). That is, the UE 702 may be configured to override or ignore procedures and/or the like that would reset or alter the CLPC adjustment state at the UE 702 during an OLPC alteration or a random-access procedure (e.g., at 708). Thus, the UE 702 may be configured to keep the current TPC accumulation for at least one CLPC at the UE 702.

Figure 10:
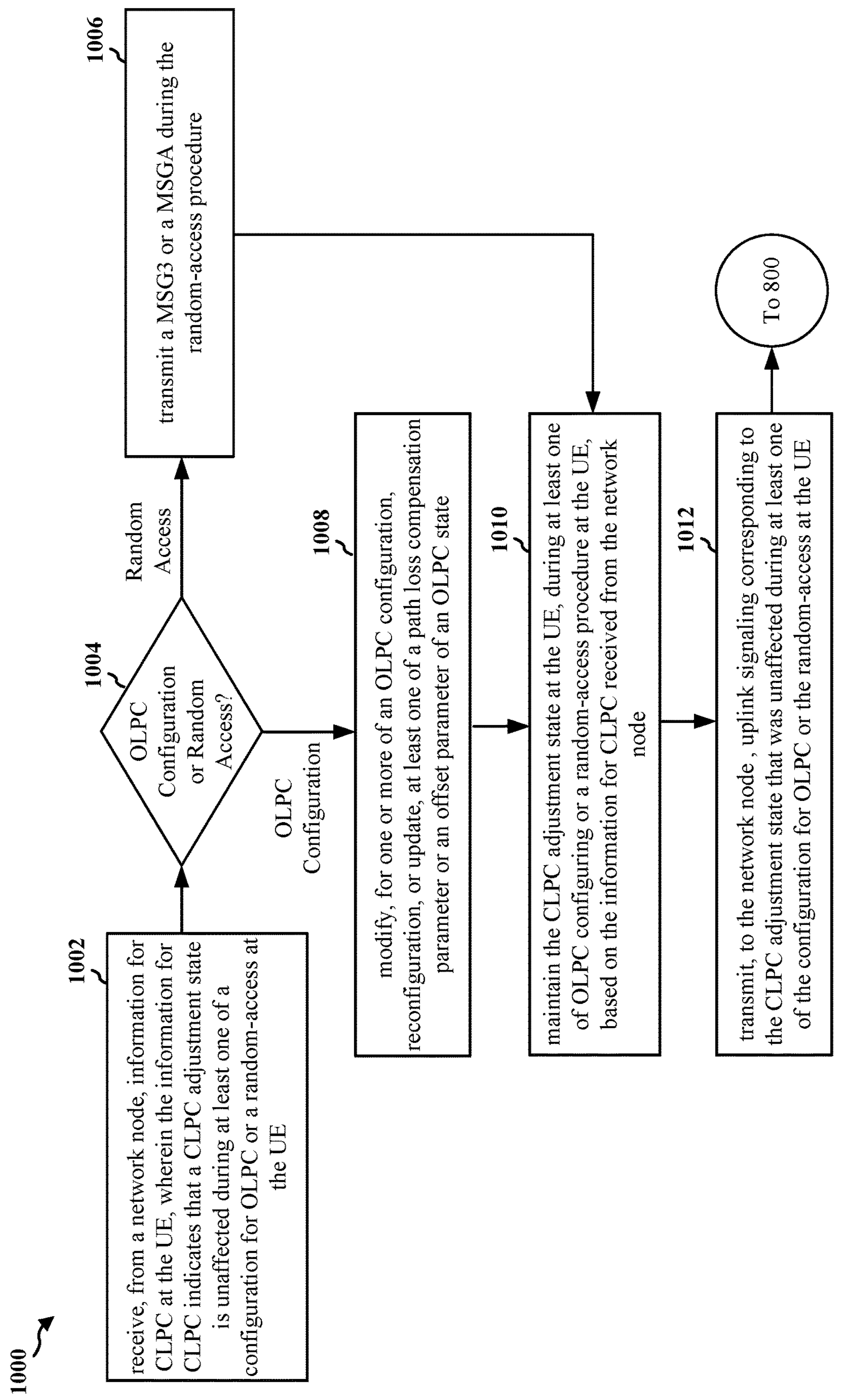
FIG. 10 is a flowchart of a method of wireless communication, in accordance with various aspects of the present disclosure.

FIG. 10 is a flowchart 1000 of a method of wireless communication, in accordance with various aspects of the present disclosure. The method may be performed by a UE (e.g., the UE 104, 402, 502, 702; the apparatus 1304). At 1002, the UE may be configured to receive, from a network node, information for CLPC at the UE, wherein the information for CLPC indicates that a CLPC adjustment state is unaffected during at least one of a configuration for OLPC or a random-access at the UE. In some aspects, 1002 may be performed by the component 198. For instance, with reference to FIG. 7, the UE 702 may receive information 706 for CLPC that is transmitted by the base station 704 or one or more components thereof. The information 706 for CLPC may be received by the UE 702 via a RRC signaling from the base station 704. The information 706 for CLPC may include, without limitation, one or more fields: a field to indicate the CLPC adjustment state is unaffected during for OLPC configuration/re-configuration and/or for random access procedures at the UE, an identifier(s) for PUSCH, PUCCH, and/or SRS, a CLPC index(es), a serving cell index, a BWP, and/or the like. The information 706 for CLPC may include at least two indices associated with the CLPC adjustment state in cases for the inclusion of at least two CLPC adjustment states respectively associated with the CLPC indices. In such a configuration, the information 706 for CLPC indicates, via at least one of the at least two CLPC indices, at least one of the at least two CLPC adjustment states to be maintained during an OLPC configuration/re-configuration and/or a random access procedure at the UE 702.

At 1004, the UE may be configured to determine the performance of an OLPC configuration or a random access procedure at the UE. In some aspects, 1004 may be performed by the component 198. For instance, with reference to FIG. 7, the UE 702 may be configured to determine the performance of, and to perform, an OLPC configuration or a random access procedure at the UE. For example, the UE 702 may be configured to modify, for one or more of an OLPC configuration, reconfiguration, or update, at least one of a path loss compensation parameter or an offset parameter of an OLPC state, and/or to transmit a MSG3 or a MSGA during the random-access procedure at the UE 702.

At 1006, the UE may be configured to transmit a MSG3 or a MSGA during the random-access procedure. In some aspects, 1006 may be performed by the component 198. For instance, with reference to FIGS. 4, 7, the UE 702, at 708, may be configured to transmit a MSG3 or a MSGA during the random-access procedure at the UE 702. For example, as described above with respect to FIG. 4 (e.g., in the context of the UE 402 for which an associated event 404 (or action, procedure, etc.) causes a change in the CLPC adjustment state which alters the power of a transmission 406). During a random-access procedure at the UE 702, the UE 702 may be configured to transmit a MSG3 or MSGA, which may attempt to cause a reset to CLPC adjustment states at the UE 702.

At 1008, the UE may be configured to modify, for one or more of an OLPC configuration, reconfiguration, or update, at least one of a path loss compensation parameter or an offset parameter of an OLPC state. In some aspects, 1008 may be performed by the component 198. For instance, with reference to FIGS. 4, 7, the UE 702, at 708, may be configured to modify, for one or more of an OLPC configuration, reconfiguration, or update, at least one of a path loss compensation parameter or an offset parameter of an OLPC state. For example, as described above with respect to FIG. 4 (e.g., in the context of the UE 402 for which an associated event 404 (or action, procedure, etc.) causes a change in the CLPC adjustment state which alters the power of a transmission 406), OLPC state parameters may be configured, re-configured, updated, and/or the like. Changes to OLPC state parameters, e.g., P0 (offset) and/or alpha (PL compensation), may attempt to cause a reset to CLPC adjustment states at the UE 702.

At 1010, the UE may be configured to reset or maintain a CLPC adjustment state in response to receiving the indication of the CLPC reset information in the MAC-CE or the DCI. In some aspects, 1010 may be performed by the component 198. For instance, with reference again to FIG. 7, in association with the modifying or transmitting at 708 by the UE 702, the UE 702 may also be configured at 710 to maintain the CLPC adjustment state at the UE 702, during at least one of OLPC configuring or a random-access procedure (at 708) at the UE, based on the information 706 for CLPC received from the base station 704 (e.g., from a network node). That is, the UE 702 may be configured to override or ignore procedures and/or the like that would reset or alter the CLPC adjustment state at the UE 702 during an OLPC alteration or a random-access procedure (e.g., at 708). Thus, the UE 702 may be configured to keep the current TPC accumulation for at least one CLPC at the UE 702.

At 1012, the UE may be configured to transmit, to the network node, uplink signaling corresponding to the CLPC adjustment state that was unaffected during at least one of the configuration for OLPC or the random-access at the UE. In some aspects, 1012 may be performed by the component 198. For instance, with reference to FIGS. 5, 7, subsequent to the CLPC adjustment state being maintained (e.g., unaffected) by the UE 702 at 710, uplink signaling 712 may be transmitted by the UE 702 to the base station 704. The uplink signaling 712 may include power characteristics that correspond to the CLPC adjustment state of the UE that is associated with the unaffected/maintained CLPC adjustment state (e.g., at 710). For example, the uplink signaling 712 may be for PUSCH, PUCCH, and/or SRS signaling that has a CLPC adjustment state for which the TPC accumulation is maintained by the UE 702 at 712 based on the information 706 for CLPC.

Subsequent to the uplink signaling 712 being transmitted, at 1002, similarly as in call flow diagram 700, may be followed by one or more parts of flowchart 800 in FIG. 8, similarly as in call flow diagram 500 (FIG. 5), by which the CLPC adjustment state of the UE 702 may be expressly, and dynamically, reset or altered, as described for FIG. 5 above and elsewhere herein.

Figure 11:
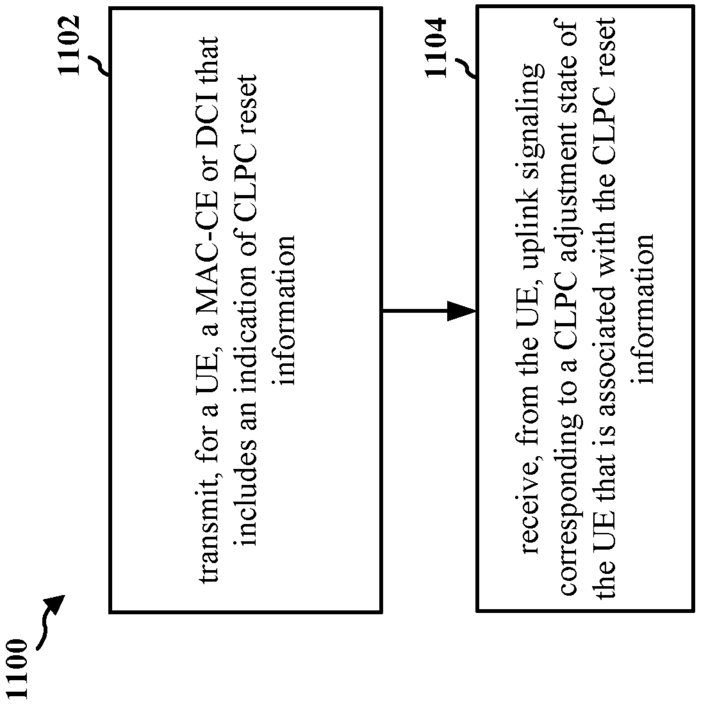
FIG. 11 is a flowchart of a method of wireless communication, in accordance with various aspects of the present disclosure.

FIG. 11 is a flowchart 1100 of a method of wireless communication, in accordance with various aspects of the present disclosure. The method may be performed by a base station (e.g., the base station 102, 504, 704; the network entity 1302. At 1102, the base station is configured to transmit, for a UE, a MAC-CE or DCI that includes an indication of CLPC reset information. In some aspects, 1102 may be performed by the component 199. For instance, with reference to FIGS. 5, 6, the base station 504, or one or more components thereof, is configured to transmit an indication 506 of CLPC reset information to the UE 502. The indication 506 of CLPC reset information may be transmitted by the base station 504 and received by the UE 502 via a MAC-CE (e.g., 652 in FIG. 6) or a DCI (e.g., 602 in FIG. 6) from the base station 504. The indication 506 of CLPC reset information may include one or more fields: an identifier(s) for PUSCH, PUCCH, and/or SRS, a CLPC index (es), a serving cell index, a BWP, a reset value(s), timing, a RNTI, an indication to reset/maintain the CLPC, and/or the like. In aspects, when provided via DCI (e.g., 602 in FIG. 6), the DCI (e.g., 602 in FIG. 6) may be a unicast DL/UL DCI, a group-common DCI, a scheduling DCI, a non-scheduling DCI, and/or the like. The indication 506 of the CLPC reset information may include at least two indices associated with the CLPC adjustment state in cases for the inclusion of at least two CLPC adjustment states respectively associated with the CLPC indices. In such a configuration, the indication 506 of CLPC reset information indicates, via at least one of the at least two CLPC indices, at least one of the at least two CLPC adjustment states to be reset or maintained.

At 1104, the base station is configured to receive, from the UE, uplink signaling corresponding to a CLPC adjustment state of the UE that is associated with the CLPC reset information. In some aspects, 1104 may be performed by the component 199. For instance, with reference again to FIGS. 6, 7, subsequent to the CLPC adjustment state being reset (e.g., reset times 606, 608, 610, 612 (DCI); 656 (MAC-CE); in FIG. 6) or maintained by the UE 502 at 508 according to the indicated timing (e.g., reset times 606, 608, 610, 612 (DCI); 656 (MAC-CE); in FIG. 6), uplink signaling 510 may be received by the base station 504 (being transmitted by the UE 502). The uplink signaling 510 may include power characteristics that correspond to the CLPC adjustment state of the UE 502 that is associated with the CLPC reset information (e.g., either as reset or maintained). For example, the uplink signaling 510 may be for PUSCH, PUCCH, and/or SRS signaling that is reset/maintained by the UE 502 at 508 based on the indication 506 of CLPC reset information.

Figure 12:
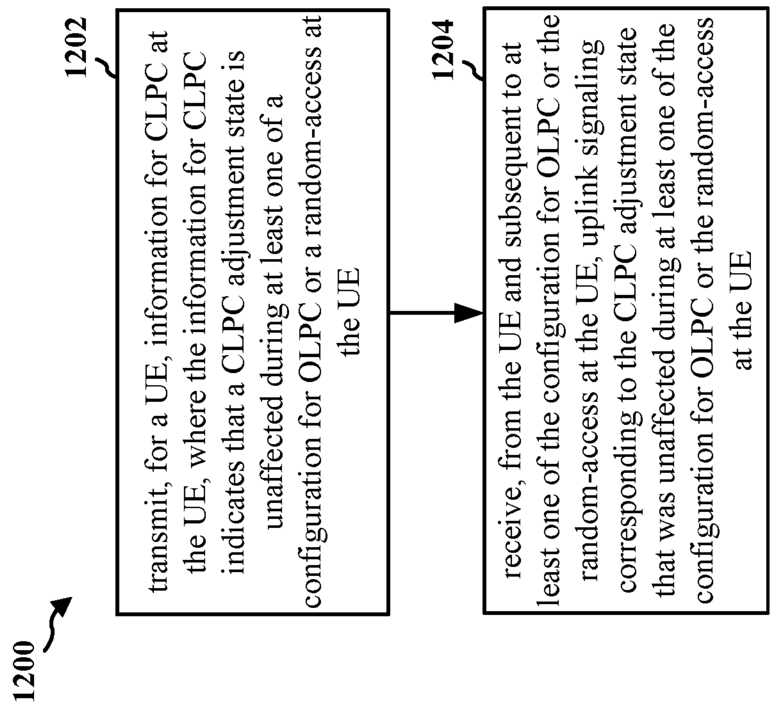
FIG. 12 is a flowchart of a method of wireless communication, in accordance with various aspects of the present disclosure.

FIG. 12 is a flowchart 1200 of a method of wireless communication, in accordance with various aspects of the present disclosure. The method may be performed by a base station (e.g., the base station 102, 504, 704; the network entity 1302. At 1202, the base station is configured to transmit, for a UE, information for CLPC at the UE, where the information for CLPC indicates that a CLPC adjustment state is unaffected during at least one of a configuration for OLPC or a random-access at the UE. In some aspects, 1202 may be performed by the component 199. For instance, with reference to FIG. 7, the base station 704, or one or more components thereof, may be configured to transmit the information 706 for CLPC to the UE 702. The information 706 for CLPC may be transmitted by the base station 704 and received by the UE 702 via a RRC signaling from the base station 704. The information 706 for CLPC may include, without limitation, one or more fields: a field to indicate the CLPC adjustment state is unaffected during for OLPC configuration/re-configuration and/or for random access procedures at the UE, an identifier(s) for PUSCH, PUCCH, and/or SRS, a CLPC index(es), a serving cell index, a BWP, and/or the like. The information 706 for CLPC may include at least two indices associated with the CLPC adjustment state in cases for the inclusion of at least two CLPC adjustment states respectively associated with the CLPC indices. In such a configuration, the information 706 for CLPC indicates, via at least one of the at least two CLPC indices, at least one of the at least two CLPC adjustment states to be maintained during an OLPC configuration/re-configuration and/or a random access procedure at the UE 702.

At 1204, the base station is configured to receive, from the UE and subsequent to at least one of the configuration for OLPC or the random-access at the UE, uplink signaling corresponding to the CLPC adjustment state that was unaffected during at least one of the configuration for OLPC or the random-access at the UE. In some aspects, 1204 may be performed by the component 199. For instance, with reference again to FIG. 7, subsequent to the CLPC adjustment state being maintained (e.g., unaffected) by the UE 702 at 710, uplink signaling 712 may be received by the base station 704 from the UE 702. The uplink signaling 712 may include power characteristics that correspond to the CLPC adjustment state of the UE that is associated with the unaffected/maintained CLPC adjustment state (e.g., at 710). For example, the uplink signaling 712 may be for PUSCH, PUCCH, and/or SRS signaling that has a CLPC adjustment state for which the TPC accumulation is maintained by the UE 702 at 712 based on the information 706 for CLPC. That is, in association with the modifying or transmitting at 708 by the UE 702, the UE 702 may be configured at 710 to maintain the CLPC adjustment state at the UE 702, during at least one of OLPC configuring or a random-access procedure (at 708) at the UE, based on the information 706 for CLPC received from the base station 704 (e.g., from a network node). That is, the UE 702 may be configured to override or ignore procedures and/or the like that would reset or alter the CLPC adjustment state at the UE 702 during an OLPC alteration or a random-access procedure (e.g., at 708). Thus, the UE 702 may be configured to keep the current TPC accumulation for at least one CLPC at the UE 702 and to transmit the uplink signaling 712 which is received by the base station 704.

Figure 13:
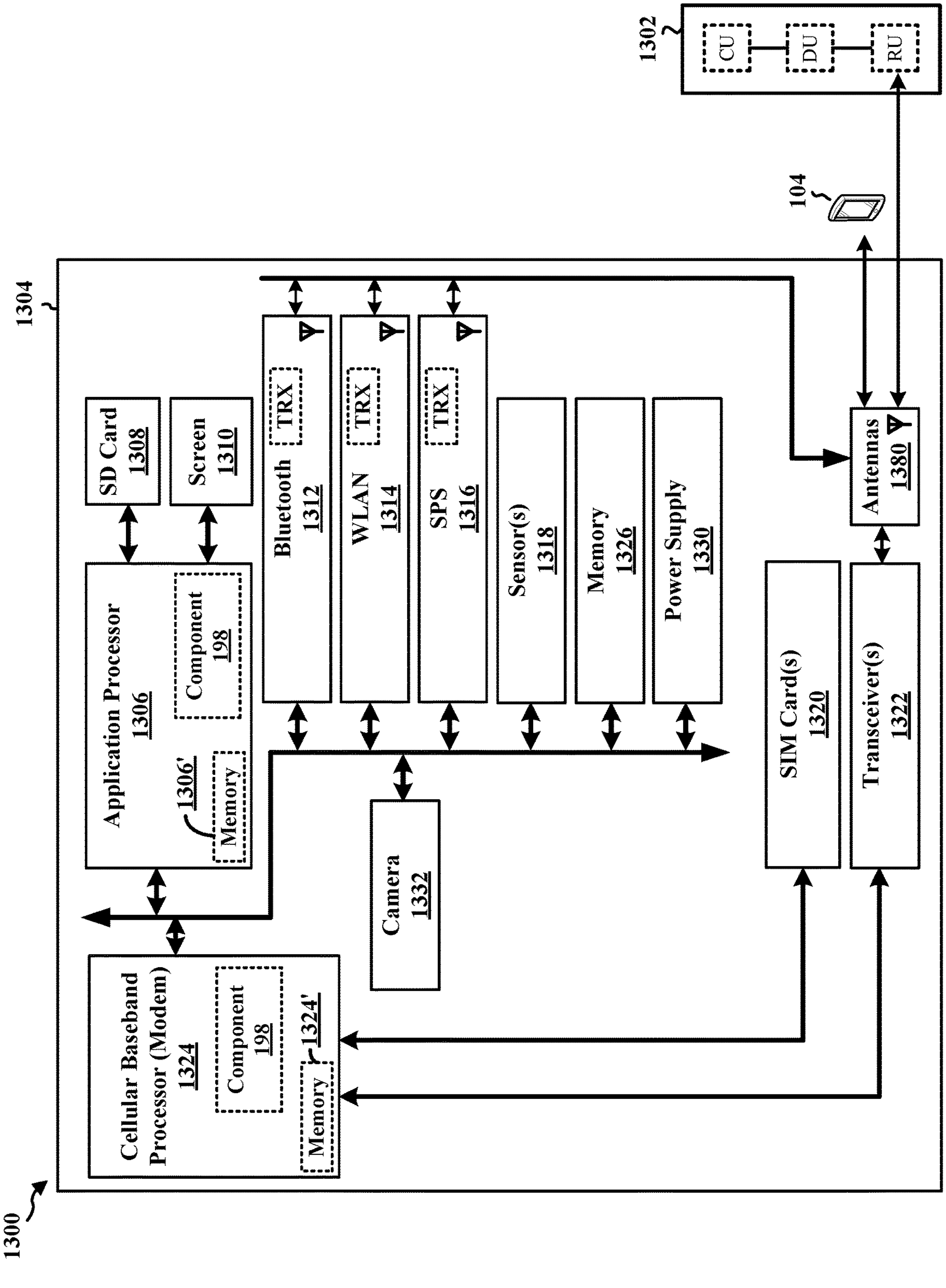
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, in one configuration, the component 198 is configured to receive, from a network node, a medium access control (MAC) control element (MAC-CE) or downlink control information (DCI) that includes an indication of closed loop power control (CLPC) reset information. The component 198 is also configured to reset or maintain a CLPC adjustment state in response to receiving the indication of the CLPC reset information in the MAC-CE or the DCI. In one configuration, the component 198 is configured to receive, from a network node, information for CLPC at the UE, where the information for CLPC indicates that a CLPC adjustment state is unaffected during at least one of a configuration for open loop power control (OLPC) or a random-access at the UE. The component 198 is also configured to maintain the CLPC adjustment state at the UE, during at least one of OLPC configuring or a random-access procedure at the UE, based on the information for CLPC received from the network node. The component 198 may be configured to perform any of the aspects described in connection with FIGS. 8, 9, 10, 11, 12 and/or performed by the UE in FIGS. 4, 5, 7. The component 198 may be within the cellular baseband processor 1324, the application processor 1306, or both the cellular baseband processor 1324 and the application processor 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1304 may include a variety of components configured for various functions. In one configuration, the apparatus 1304, and in particular the cellular baseband processor 1324 and/or the application processor 1306, includes means for receiving, from a network node, a medium access control (MAC) control element (MAC-CE) or downlink control information (DCI) that includes an indication of closed loop power control (CLPC) reset information. In the configuration, the apparatus 1304, and in particular the cellular baseband processor 1324 and/or the application processor 1306, also includes means for resetting or maintaining a CLPC adjustment state in response to receiving the indication of the CLPC reset information in the MAC-CE or the DCI. In a configuration, the apparatus 1304, and in particular the cellular baseband processor 1324 and/or the application processor 1306, may include means for maintaining the CLPC adjustment state when the information in another DCI indicates for the UE to not reset the CLPC adjustment state. In one configuration, the apparatus 1304, and in particular the cellular baseband processor 1324 and/or the application processor 1306, includes means for receiving, from a network node, information for closed loop power control (CLPC) at the UE, wherein the information for CLPC indicates that a CLPC adjustment state is unaffected during at least one of a configuration for open loop power control (OLPC) or a random-access at the UE. In the configuration, the apparatus 1304, and in particular the cellular baseband processor 1324 and/or the application processor 1306, also includes means for maintaining the CLPC adjustment state at the UE, during at least one of OLPC configuring or a random-access procedure at the UE, based on the information for CLPC received from the network node. In the configuration, the apparatus 1304, and in particular the cellular baseband processor 1324 and/or the application processor 1306, may include means for receiving, from a network node, a medium access control (MAC) control element (MAC-CE) or downlink control information (DCI) that includes an indication of closed loop power control (CLPC) reset information. In the configuration, the apparatus 1304, and in particular the cellular baseband processor 1324 and/or the application processor 1306, may also include means for resetting or maintaining a CLPC adjustment state in response to receiving the indication of the CLPC reset information in the MAC-CE or the DCI. In the configuration, the apparatus 1304, and in particular the cellular baseband processor 1324 and/or the application processor 1306, may include means for modifying, for one or more of an OLPC configuration, reconfiguration, or update, at least one of a path loss compensation parameter or an offset parameter of an OLPC state, and/or means for transmitting a MSG3 or a MSGA during the random-access procedure. The application processor 1306 may include means for performing any of the aspects described in connection with FIGS. 8, 9, 10, 11, 12 and/or performed by the UE in FIGS. 4, 5, 7. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
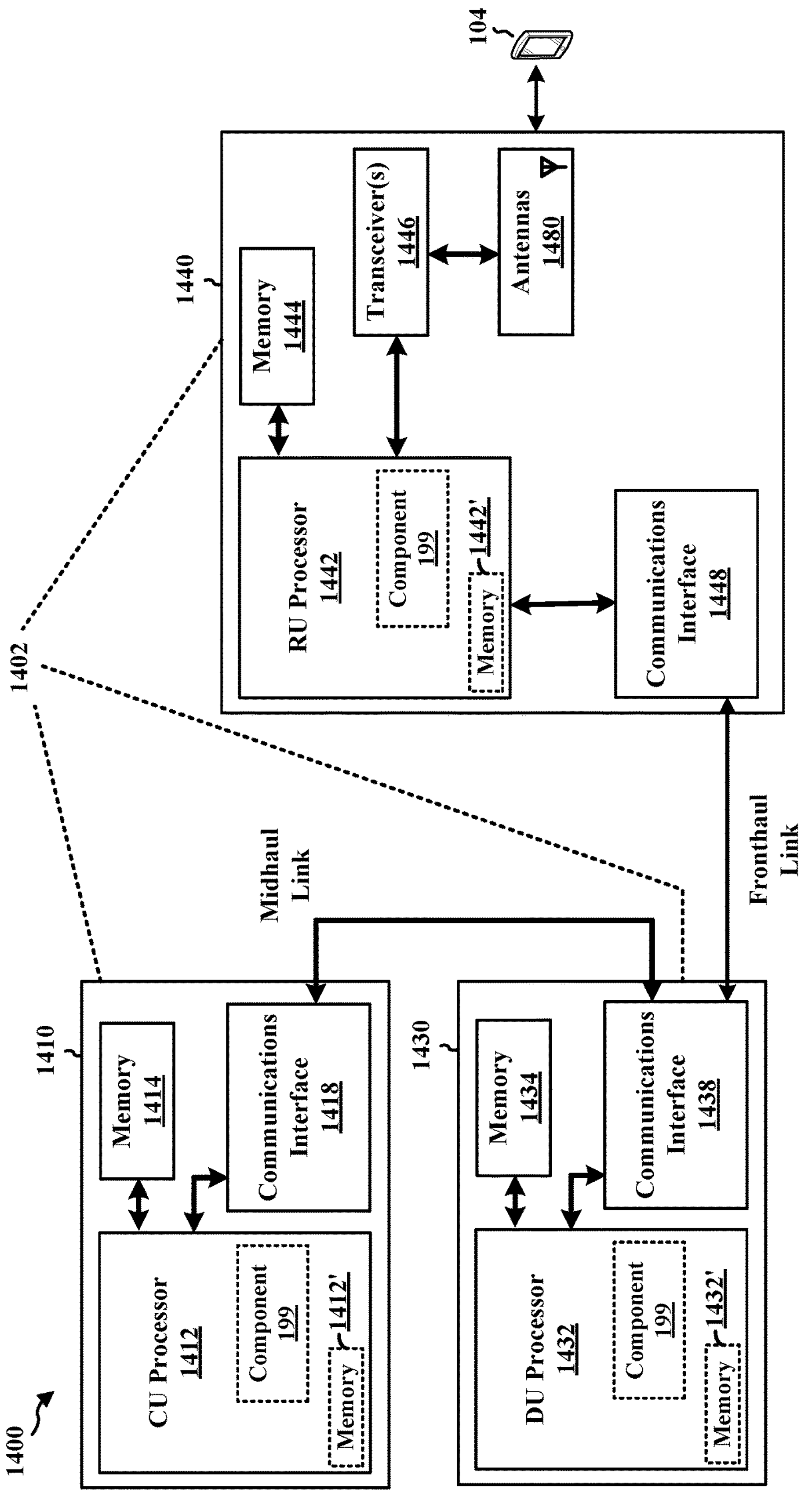
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412', 1432', 1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, in a configuration, the component 199 is configured to transmit, for a UE, a MAC-CE or DCI that includes an indication of CLPC reset information. In the configuration, the component 199 is also configured to receive, from the UE, uplink signaling corresponding to a CLPC adjustment state of the UE that is associated with the CLPC reset information. In a configuration, the component 199 is configured to transmit, for a UE, information for CLPC at the UE, where the information for CLPC indicates that a CLPC adjustment state is unaffected during at least one of a configuration for OLPC or a random-access at the UE. In the configuration, the component 199 is also configured to receive, from the UE and subsequent to at least one of the configuration for OLPC or the random-access at the UE, uplink signaling corresponding to the CLPC adjustment state that was unaffected during at least one of the configuration for OLPC or the random-access at the UE. The component 199 may be further configured to perform any of the aspects described in connection with FIGS. 8, 9, 10, 11, 12 and/or performed by the network entity/node (e.g., a gNB; a base station) in FIGS. 5, 7. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for transmitting, for a user equipment (UE), a medium access control (MAC) control element (MAC-CE) or downlink control information (DCI) that includes an indication of closed loop power control (CLPC) reset information. In the configuration, the network entity 1402 also includes means for receiving, from the UE, uplink signaling corresponding to a CLPC adjustment state of the UE that is associated with the CLPC reset information. In one configuration, the network entity 1402 includes means for transmitting, for a UE, information for CLPC at the UE, wherein the information for CLPC indicates that a CLPC adjustment state is unaffected during at least one of a configuration for OLPC or a random-access at the UE. In the configuration, the network entity 1402 also includes means for receiving, from the UE and subsequent to at least one of the configuration for OLPC or the random-access at the UE, uplink signaling corresponding to the CLPC adjustment state that was unaffected during at least one of the configuration for OLPC or the random-access at the UE. The network entity 1402 may include means for performing any of the aspects described in connection with FIGS. 8, 9, 10, 11, 12 and/or performed by the network entity/node (e.g., gNB; base station, a component of a base station) in FIGS. 5, 7. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Some wireless networks provide for power control of a UE that may be performed by a network node, such as a base station. Configured power control for a UE may include an OLPC part and a CLPC part. A CLPC reset at a UE may occur when an RRC configuration configures/re-configures a power offset and/or a path loss compensation parameter for OLPC, or after a random access procedure at a UE. However, a base station may also want to reset or alter the CLPC in other situations. Additionally, there may be scenarios in which communication may be improved if the UE does not reset its CLPC due to existing procedures. For instance, when a power offset or a path loss compensation parameter for OLPC is configured/re-configured, or when a random access procedure is performed, it may be better for the UE to maintain its CLPC adjustment state based on its present accumulation via transmit power control (TPC). Aspects described herein for indications of CLPC reset provide enhancements and flexibility to the existing procedures for resetting CLPC adjustment state(s) for a UE in a wireless network. For example, in cases where a reset of CLPC adjustment state is desired by a base station outside of a power offset and/or a path loss compensation parameter configuration/re-configuration, the aspects herein improve power efficiency by providing the capability to reset, or set to a different value, the CLPC adjustment state (e.g., due to interference profile changes in the network, without a base station sending enough positive '+' or negative '−' TPC commands for different UEs to achieve an effective reset of the UE CLPC, and to account for accumulation functions becoming un-synchronized between a UE and a base station). In scenarios where a reset of CLPC adjustment state is not desired, as noted herein, but may be part of a procedure or action, the aspects herein improve power efficiency by providing the capability to maintain the CLPC adjustment state of a UE(s). For instance, aspects provide for maintaining the CLPC adjustment state when a power offset and/or a path loss compensation parameter for OLPC is configured/re-configured, or when a random access procedure is performed. Accordingly, the described aspects for indications of CLCP reset provide for a base station and/or a UE to determine CLPC reset information and/or actions by which a UE more dynamically resets or maintains its CLPC adjustment state for specific scenarios which improves power and signaling efficiency.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising receiving, from a network node, a medium access control (MAC) control element (MAC-CE) or downlink control information (DCI) that includes an indication of closed loop power control (CLPC) reset information, and resetting or maintaining a CLPC adjustment state in response to receiving the indication of the CLPC reset information in the MAC-CE or the DCI.

Aspect 2 is the method of aspect 1, where the indication of the CLPC reset information includes at least one identifier for at least one of a physical uplink shared channel (PUSCH), a physical uplink control channel (PUCCH), or a sounding resource signal (SRS).

Aspect 3 is the method of any of aspects 1 and 2, where the CLPC adjustment state includes at least two CLPC adjustment states respectively associated with at least two CLPC indices, and where the indication of CLPC reset information indicates, via at least one of the at least two CLPC indices, at least one of the at least two CLPC adjustment states to be reset.

Aspect 4 is the method of any of aspects 1 to 3, where the MAC-CE includes the indication of the CLPC reset information, where resetting the CLPC adjustment state includes resetting the CLPC adjustment state after a fixed time subsequent to a hybrid automatic repeat request (HARQ) acknowledgment (HARQ-ACK) that corresponds to a physical downlink shared channel (PDSCH) that includes the MAC-CE, and where receiving the MAC-CE that includes the indication of CLPC reset information includes receiving the MAC-CE that includes the indication of CLPC reset information via at least one transceiver of the UE.

Aspect 5 is the method of aspect 4, where the CLPC reset information includes at least one of: a serving cell index, a bandwidth part (BWP) identifier, respective identifiers for one or more of a physical uplink shared channel (PUSCH), a physical uplink control channel (PUCCH), or a sounding resource signal (SRS), or a CLPC index.

Aspect 6 is the method of any of aspects 1 to 3, where the DCI includes the indication of the CLPC reset information, and where resetting the CLPC adjustment state includes resetting the CLPC adjustment state after a period of time subsequent to a last symbol of the DCI.

Aspect 7 is the method of any of aspects 1 to 3, where the DCI includes the indication of the CLPC reset information, and where resetting the CLPC adjustment state includes resetting the CLPC adjustment state after a period of time subsequent to a start of a next slot after a last symbol of the DCI.

Aspect 8 is the method of any of aspects 1 to 3, where the DCI includes the indication of the CLPC reset information, and where resetting the CLPC adjustment state includes resetting the CLPC adjustment state after a period of time subsequent to a last symbol of a hybrid automatic repeat request (HARQ) acknowledgment (HARQ-ACK) transmission responsive to the DCI.

Aspect 9 is the method of any of aspects 1 to 3, where the DCI includes the indication of the CLPC reset information, and where resetting the CLPC adjustment state includes resetting the CLPC adjustment state after a period of time subsequent to a start of a next slot after a last symbol of a hybrid automatic repeat request (HARQ) acknowledgment (HARQ-ACK) transmission responsive to the DCI.

Aspect 10 is the method of any of aspects 1 to 3 and 6 to 9, where the DCI includes the indication of the CLPC reset information, where the DCI is a unicast downlink DCI that is scheduling or non-scheduling, a unicast uplink DCI that is scheduling or non-scheduling, or a group-common DCI, and where the indication of CLPC reset information is configured for the UE and for at least one additional UE.

Aspect 11 is the method of aspect 10, where the indication of the CLPC reset information is at least one radio network temporary identifier (RNTI) of the DCI.

Aspect 12 is the method of any of aspects 1 to 11, where resetting the CLPC adjustment state includes resetting the CLPC adjustment state to zero or to a fixed, non-zero value.

Aspect 13 is the method of any of aspects 1 to 3 and 6 to 12, where the method further includes maintaining the CLPC adjustment state when the information in another DCI indicates for the UE to not reset the CLPC adjustment state.

Aspect 14 is a method of wireless communication at a user equipment (UE), comprising: receiving, from a network node, information for closed loop power control (CLPC) at the UE, where the information for CLPC indicates that a CLPC adjustment state is unaffected during at least one of a configuration for open loop power control (OLPC) or a random-access at the UE, and maintaining the CLPC adjustment state at the UE, during at least one of OLPC configuring or a random-access procedure at the UE, based on the information for CLPC received from the network node.

Aspect 15 is the method of aspect 14, where receiving the information for CLPC at the UE includes receiving configuration information via radio resource control (RRC) signaling and via at least one transceiver of the UE.

Aspect 16 is the method of aspects 14 and 15, where the method further includes: receiving, from the network node, a medium access control (MAC) control element (MAC-CE) or downlink control information (DCI) that includes an indication of CLPC reset information, and resetting the CLPC adjustment state in response to receiving in the indication of the CLPC reset information in the MAC-CE or the DCI.

Aspect 17 is the method of any of aspects 14 to 16, where the method further includes at least one of: modifying, for one or more of an OLPC configuration, reconfiguration, or update, at least one of a path loss compensation parameter or an offset parameter of an OLPC state, or transmitting a MSG3 or a MS GA during the random-access procedure.

Aspect 18 is the method of any of aspects 14 to 17, where the information for CLPC indicates that the CLPC adjustment state is unaffected for at least one of a physical uplink shared channel (PUSCH), a physical uplink control channel (PUCCH), or a sounding resource signal (SRS).

Aspect 19 is the method of any of aspects 14 to 18, where the CLPC adjustment state includes at least two CLPC adjustment states respectively associated with at least two CLPC indices, and where the information for CLPC indicates, via at least one of the at least two CLPC indices, that at least one of the at least two CLPC adjustment states are unaffected.

Aspect 20 is a method of wireless communication at a network node, comprising: transmitting, for a user equipment (UE), a medium access control (MAC) control element (MAC-CE) or downlink control information (DCI) that includes an indication of closed loop power control (CLPC) reset information, and receiving, from the UE, uplink signaling corresponding to a CLPC adjustment state of the UE that is associated with the CLPC reset information.

Aspect 21 is the method of aspect 20, where the indication of CLPC reset information includes at least one identifier for at least one of a physical uplink shared channel (PUSCH), a physical uplink control channel (PUCCH), or a sounding resource signal (SRS).

Aspect 22 is the method of aspects 20 and 21, where the CLPC adjustment state includes at least two CLPC adjustment states respectively associated with at least two CLPC indices, and where the indication of CLPC reset information indicates, via at least one of the at least two CLPC indices, at least one of the at least two CLPC adjustment states to be reset.

Aspect 23 is the method of any of aspects 20 to 22, where the MAC-CE includes the indication of the CLPC reset information, and where receiving the uplink signaling includes receiving the uplink signaling, via at least one transceiver of the network node, after a fixed time subsequent to a hybrid automatic repeat request (HARM) acknowledgment (HARQ-ACK) that corresponds to a physical downlink shared channel (PDSCH) that includes the MAC-CE.

Aspect 24 is the method of any of aspects 20 to 22, where the DCI includes the indication of the CLPC reset information, and where receiving the uplink signaling includes receiving the uplink signaling after a period of time subsequent to a last symbol of the DCI.

Aspect 25 is the method of any of aspects 20 to 22, where the DCI includes the indication of the CLPC reset information, and where receiving the uplink signaling includes receiving the uplink signaling after a period of time subsequent to a start of a next slot after a last symbol of the DCI.

Aspect 26 is the method of any of aspects 20 to 22, where the DCI includes the indication of the CLPC reset information, and where receiving the uplink signaling includes receiving the uplink signaling after a period of time subsequent to a last symbol of a hybrid automatic repeat request (HARQ) acknowledgment (HARQ-ACK) transmission responsive to the DCI.

Aspect 27 is the method of any of aspects 20 to 22, where the DCI includes the indication of the CLPC reset information, and wherein receiving the uplink signaling includes receiving the uplink signaling after a period of time subsequent to a start of a next slot after a last symbol of a hybrid automatic repeat request (HARQ) acknowledgment (HARQ-ACK) transmission responsive to the DCI.

Aspect 28 is a method of wireless communication at a network node, comprising: transmitting, for a user equipment (UE), information for closed loop power control (CLPC) at the UE, where the information for CLPC indicates that a CLPC adjustment state is unaffected during at least one of a configuration for open loop power control (OLPC) or a random-access at the UE, and receiving, from the UE and subsequent to at least one of the configuration for OLPC or the random-access at the UE, uplink signaling corresponding to the CLPC adjustment state that was unaffected during at least one of the configuration for OLPC or the random-access at the UE.

Aspect 29 is the method of aspect 28, where the information for CLPC indicates that the CLPC adjustment state is unaffected for at least one of a physical uplink shared channel (PUSCH), a physical uplink control channel (PUCCH), or a sounding resource signal (SRS), and where transmitting the information for CLPC at the UE includes transmitting the information for CLPC at the UE via at least one transceiver of the network node.

Aspect 30 is the method of aspects 28 and 29, where the CLPC adjustment state includes at least two CLPC adjustment states respectively associated with at least two CLPC indices, and where the information for CLPC indicates, via at least one of the at least two CLPC indices, that at least one of the at least two CLPC adjustment states are unaffected.

Aspect 31 is an apparatus for wireless communication configured to implement any of aspects 1 to 30.

Aspect 32 is an apparatus for wireless communication including means for implementing any of aspects 1 to 30.

Aspect 33 is a computer-readable medium (e.g., a non-transitory computer-readable medium) storing computer executable code, the code when executed by at least one processor causes the at least one processor to implement any of aspects 1 to 30.

What is claimed is:

1. An apparatus for wireless communication at a user equipment (UE), comprising:

memory; and at least one processor coupled to the memory and, based at least in part on information stored in the memory, the at least one processor is configured to:

receive, from a network node based on a change in a network interference profile, downlink control information (DCI) that includes an indication to expressly reset one or more closed loop power control (CLPC) parameters, the indication comprising CLPC reset information; and reset a CLPC adjustment state in response to receiving the indication in the DCI.

2. The apparatus of claim 1, wherein the CLPC reset information includes at least one identifier for at least one of a physical uplink shared channel (PUSCH), a physical uplink control channel (PUCCH), or a sounding resource signal (SRS).

3. The apparatus of claim 1, wherein the CLPC adjustment state includes at least two CLPC adjustment states respectively associated with at least two CLPC indices, and wherein the CLPC reset information indicates, via at least one of the at least two CLPC indices, at least one of the at least two CLPC adjustment states to be reset.

4. The apparatus of claim 1, wherein the CLPC reset information includes at least one of:

a serving cell index;

a bandwidth part (BWP) identifier;

respective identifiers for one or more of a physical uplink shared channel (PUSCH), a physical uplink control channel (PUCCH), or a sounding resource signal (SRS); or a CLPC index.

5. The apparatus of claim 1, wherein the DCI includes the indication to expressly reset the one or more CLPC reset parameters; and wherein to reset the CLPC adjustment state, the at least one processor is configured to reset the CLPC adjustment state after a period of time subsequent to a last symbol of the DCI.

6. The apparatus of claim 1, wherein the DCI includes the indication to expressly reset the one or more CLPC reset parameters; and wherein to reset the CLPC adjustment state, the at least one processor is configured to reset the CLPC adjustment state after a period of time subsequent to a start of a next slot after a last symbol of the DCI.

7. The apparatus of claim 1, wherein the DCI indication to expressly reset the one or more CLPC reset parameters; and wherein to reset the CLPC adjustment state, the at least one processor is configured to reset the CLPC adjustment state after a period of time subsequent to a last symbol of a hybrid automatic repeat request (HARQ) acknowledgment (HARQ-ACK) transmission responsive to the DCI.

8. The apparatus of claim 1, wherein the DCI includes the indication to expressly reset the one or more CLPC reset parameters; and wherein to reset the CLPC adjustment state, the at least one processor is configured to reset the CLPC adjustment state after a period of time subsequent to a start of a next slot after a last symbol of a hybrid automatic repeat request (HARQ) acknowledgment (HARQ-ACK) transmission responsive to the DCI.

9. The apparatus of claim 1, wherein the DCI includes the indication to expressly reset the one or more CLPC reset parameters; and wherein the DCI is:

a unicast downlink DCI that is scheduling or non-scheduling;

a unicast uplink DCI that is scheduling or non-scheduling; or a group-common DCI, wherein the indication of CLPC reset information is configured for the UE and for at least one additional UE.

10. The apparatus of claim 9, wherein the CLPC reset information is at least one radio network temporary identifier (RNTI) of the DCI.

11. The apparatus of claim 1, wherein to reset the CLPC adjustment state, the at least one processor is configured to reset the CLPC adjustment state to zero or to a fixed, non-zero value.

12. An apparatus for wireless communication at a user equipment (UE), comprising:

memory; and at least one processor coupled to the memory and, based at least in part on stored information that is stored in the memory, the at least one processor is configured to:

receive, from a network node, information for closed loop power control (CLPC) at the UE, wherein the information for the CLPC indicates that a CLPC adjustment state is unaffected during at least one of a configuration for open loop power control (OLPC) or a random-access at the UE; and maintain the CLPC adjustment state at the UE, during at least one of OLPC configuring or a random-access procedure at the UE, based on the information for the CLPC received from the network node.

13. The apparatus of claim 12, wherein to receive the information for the CLPC at the UE, the at least one processor is configured to receive configuration information via radio resource control (RRC) signaling.

14. The apparatus of claim 13, wherein the at least one processor is further configured to:

receive, from the network node, a medium access control (MAC) control element (MAC-CE) or downlink control information (DCI) that includes an indication of CLPC reset information; and reset the CLPC adjustment state in response to receiving in the indication of the CLPC reset information in the MAC-CE or the DCI.

15. The apparatus of claim 12, wherein the at least one processor is further configured to:

modify, for one or more of an OLPC configuration, reconfiguration, or update, at least one of a path loss compensation parameter or an offset parameter of an OLPC state; or transmit a MSG3 or a MSGA during the random-access procedure.

16. The apparatus of claim 12, wherein the information for the CLPC indicates that the CLPC adjustment state is unaffected for at least one of a physical uplink shared channel (PUSCH), a physical uplink control channel (PUCCH), or a sounding resource signal (SRS).

17. The apparatus of claim 12, wherein the CLPC adjustment state includes at least two CLPC adjustment states respectively associated with at least two CLPC indices, and wherein the information for the CLPC indicates, via at least one of the at least two CLPC indices, that at least one of the at least two CLPC adjustment states are unaffected.

18. An apparatus for wireless communication at a network node, comprising:

memory; and at least one processor coupled to the memory and, based at least in part on information stored in the memory, the at least one processor is configured to:

transmit, for a user equipment (UE) based on a change in a network interference profile, downlink control information (DCI) that includes an indication of closed loop power control (CLPC) reset information; and receive, from the UE, uplink signaling corresponding to a CLPC adjustment state of the UE that is associated with the CLPC reset information;

wherein the indication of CLPC reset information is configured to reset the CLPC adjustment state according to a zero or non-zero value included in the indication.

19. The apparatus of claim 18, wherein the indication of CLPC reset information includes at least one identifier for at least one of a physical uplink shared channel (PUSCH), a physical uplink control channel (PUCCH), or a sounding resource signal (SRS).

20. The apparatus of claim 18, wherein the CLPC adjustment state includes at least two CLPC adjustment states respectively associated with at least two CLPC indices, and wherein the indication of CLPC reset information indicates, via at least one of the at least two CLPC indices, at least one of the at least two CLPC adjustment states to be reset.

21. The apparatus of claim 18, wherein the DCI includes the indication of the CLPC reset information, and wherein to receive the uplink signaling, the at least one processor is configured to receive the uplink signaling after a period of time subsequent to a last symbol of the DCI.

22. The apparatus of claim 18, wherein the DCI includes the indication of the CLPC reset information, and wherein to receive the uplink signaling, the at least one processor is configured to receive the uplink signaling after a period of time subsequent to a start of a next slot after a last symbol of the DCI.

23. The apparatus of claim 18, wherein the DCI includes the indication of the CLPC reset information, and wherein to receive the uplink signaling, the at least one processor is configured to receive the uplink signaling after a period of time subsequent to a last symbol of a hybrid automatic repeat request (HARQ) acknowledgment (HARQ-ACK) transmission responsive to the DCI.

24. The apparatus of claim 18, wherein the DCI includes the indication of the CLPC reset information, and wherein to receive the uplink signaling, the at least one processor is configured to receive the uplink signaling after a period of time subsequent to a start of a next slot after a last symbol of a hybrid automatic repeat request (HARQ) acknowledgment (HARQ-ACK) transmission responsive to the DCI.

25. An apparatus for wireless communication at a network node, comprising:

memory; and at least one processor coupled to the memory and, based at least in part on stored information that is stored in the memory, the at least one processor is configured to:

transmit, for a user equipment (UE), information for closed loop power control (CLPC) at the UE, wherein the information for the CLPC indicates that a CLPC adjustment state is unaffected during at least one of a configuration for open loop power control (OLPC) or a random-access at the UE; and receive, from the UE and subsequent to at least one of the configuration for the OLPC or the random-access at the UE, uplink signaling corresponding to the CLPC adjustment state that was unaffected during at least one of the configuration for the OLPC or the random-access at the UE.

26. The apparatus of claim 25, wherein the information for the CLPC indicates that the CLPC adjustment state is unaffected for at least one of a physical uplink shared channel (PUSCH), a physical uplink control channel (PUCCH), or a sounding resource signal (SRS).

27. The apparatus of claim 25, wherein the CLPC adjustment state includes at least two CLPC adjustment states respectively associated with at least two CLPC indices, and wherein the information for the CLPC indicates, via at least one of the at least two CLPC indices, that at least one of the at least two CLPC adjustment states are unaffected.

* * * * *